(12) United States Patent
Yuan et al.

(10) Patent No.: US 11,967,312 B2
(45) Date of Patent: Apr. 23, 2024

(54) METHOD AND APPARATUS FOR TRAINING SEMANTIC UNDERSTANDING MODEL, ELECTRONIC DEVICE, AND STORAGE MEDIUM

(71) Applicant: Tencent Technology (Shenzhen) Company Limited, Shenzhen (CN)

(72) Inventors: Gang Yuan, Shenzhen (CN); Xuemin Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 344 days.

(21) Appl. No.: 17/503,174

(22) Filed: Oct. 15, 2021

(65) Prior Publication Data

US 2022/0036890 A1 Feb. 3, 2022

Related U.S. Application Data

(63) Continuation of application No. PCT/CN2020/115755, filed on Sep. 17, 2020.

(30) Foreign Application Priority Data

Oct. 30, 2019 (CN) .......................... 201911047037.9

(51) Int. Cl.
*G06N 3/08* (2023.01)
*G06F 40/30* (2020.01)
(Continued)

(52) U.S. Cl.
CPC .......... *G10L 15/1815* (2013.01); *G06F 40/30* (2020.01); *G06N 3/08* (2013.01); *G10L 15/063* (2013.01); *G10L 15/26* (2013.01)

(58) Field of Classification Search
CPC .................................. G06N 3/08; G06F 40/30
See application file for complete search history.

(56) References Cited

U.S. PATENT DOCUMENTS

2006/0277028 A1* 12/2006 Chen ...................... G06F 40/216
704/4
2008/0177547 A1 7/2008 Yaman et al.
(Continued)

FOREIGN PATENT DOCUMENTS

CN 106558309 A 4/2017
CN 107871496 A 4/2018
(Continued)

OTHER PUBLICATIONS

Wang, Wei, et al. "Denoising neural machine translation training with trusted data and online data selection." arXiv preprint arXiv:1809.00068 (2018). (Year: 2018).*

(Continued)

*Primary Examiner* — Jialong He
(74) *Attorney, Agent, or Firm* — Morgan, Lewis & Bockius LLP

(57) ABSTRACT

This application provides a method for training a semantic understanding model, including: obtaining a first training sample set; performing denoising processing on the first training sample set to form a corresponding second training sample set; processing the second training sample set by using a semantic understanding model, to determine initial parameters of the semantic understanding model; processing the second training sample set by using the semantic understanding model in response to the initial parameters of the semantic understanding model, to determine update parameters of the semantic understanding model; and iteratively updating a semantic representation layer network parameter and a task-related output layer network parameter of the semantic understanding model by using the second training (Continued)

sample set and according to the update parameters of the semantic understanding model. This application further provides a method and apparatus for processing a semantic understanding model, an electronic device, and a storage medium.

20 Claims, 19 Drawing Sheets

(51) Int. Cl.
*G10L 15/06* (2013.01)
*G10L 15/18* (2013.01)
*G10L 15/26* (2006.01)

(56) References Cited

U.S. PATENT DOCUMENTS

| | | | |
|---|---|---|---|
| 2017/0060844 | A1 | 3/2017 | He et al. |
| 2018/0068652 | A1 | 3/2018 | Yong et al. |
| 2019/0050395 | A1* | 2/2019 | Min ........................ G06N 3/088 |
| 2019/0354810 | A1* | 11/2019 | Samel ................... G06F 18/231 |
| 2020/0285702 | A1* | 9/2020 | Padhi ....................... G06N 3/08 |

FOREIGN PATENT DOCUMENTS

| | | |
|---|---|---|
| CN | 108417205 A | 8/2018 |
| CN | 108920622 A | 11/2018 |
| CN | 109214349 A | 1/2019 |
| CN | 109947918 A | 6/2019 |
| CN | 110097130 A | 8/2019 |
| CN | 110188202 A | 8/2019 |
| CN | 110188331 A | 8/2019 |
| CN | 110222164 A | 9/2019 |
| CN | 110275939 A | 9/2019 |
| CN | 110807332 A | 2/2020 |

OTHER PUBLICATIONS

Freitag, Markus, and Scott Roy. "Unsupervised natural language generation with denoising autoencoders." arXiv preprint arXiv:1804.07899 (2018). (Year: 2018).*
Tencent Technology, WO, PCT/CN2020/115755, Dec. 23, 2020, 5 pgs.
Tencent Technology, IPRP, PCT/CN2020/115755, May 3, 2022, 6 pgs.
Tencent Technology, ISR, PCT/CN2020/115755, Dec. 23, 2020, 3 pgs.
Alvaro Peris et al., "Active Learning for Interactive Neural Machine Translation of Data Streams", Proceedings of the 22nd Conference on Computational Natural Language Learning (CoNLL 2018), Aug. 22, 2019, 10 pgs., Retrieved from the Internet: https://aclanthology.org/K18-1015.pdf.
"Neural Machine Translation that Recycles Pre-trained BERT Encoder", IPSJ SIG Technical Report, 2019 Information Processing Society of Japan, Aug. 29, 2019, 10 pgs.
Ryoichi Takashima et al., "Application of Noise-Robust Speech Translation Using Asynchronous Smart Devices", 2016 Information Processing Society of Japan, 8 pgs.

* cited by examiner

METHOD AND APPARATUS FOR TRAINING SEMANTIC UNDERSTANDING MODEL, ELECTRONIC DEVICE, AND STORAGE MEDIUM

CROSS REFERENCE TO RELATED APPLICATIONS

This application is a continuation application of PCT Patent Application No. PCT/CN2020/115755, entitled "SEMANTIC UNDERSTANDING MODEL TRAINING METHOD AND APPARATUS, AND ELECTRONIC DEVICE AND STORAGE MEDIUM" filed on Sep. 17, 2020, which claims priority to Chinese Patent Application No. 201911047037.9, filed with the State Intellectual Property Office of the People's Republic of China on Oct. 30, 2019, and entitled "SEMANTIC COMPREHENSION MODEL TRAINING METHOD AND DEVICE, SEMANTIC PROCESSING METHOD AND DEVICE AND STORAGE MEDIUM", all of which are incorporated herein by reference in their entirety.

FIELD OF THE TECHNOLOGY

This application relates to machine learning technologies, and in particular, to a method and apparatus for training a semantic understanding model, a semantic processing method for a semantic understanding model, an electronic device, and a storage medium.

BACKGROUND OF THE DISCLOSURE

In a use scenario of full-duplex speech interaction, the following operations need to be implemented in a multi-sound source environment where a plurality of sound sources continuously emit sounds at the same time: for example, the recognition of speech identities (male, female, and children), triggering dialogs with different content, speech emotion recognition, and music/singing recognition; and environmental processing, which includes background noise recognition and echo cancellation. In this process of a full-duplex dialog scenario of a semantic understanding model, an out-of-domain (OOD) corpus such as background noise and small talk of another person is more likely to be listened to by an intelligent assistant. If such corpus is mis-responded by the intelligent assistant, the interaction success rate is relatively low, which affects the user experience. Therefore, in the full-duplex scenario, there are higher requirements for the domain intent recognition accuracy in a dialog system, and the semantic understanding model is required to learn when to reject (that is, refuse to respond) and when to respond to what a user spoke, to improve the user experience and reduce the power consumption of an electronic device due to frequent invalid triggers.

SUMMARY

In view of this, embodiments of this application provide a method and apparatus for training a semantic understanding model, a semantic processing method for a semantic understanding model, an electronic device, and a storage medium, which can enhance the generalization ability of the semantic understanding model and improve the training accuracy and training speed of the semantic understanding model. In addition, the existing noise sentences can be fully utilized to obtain the gain in model training, so that the semantic understanding model can adapt to different use scenarios, and the impact of environmental noise on the semantic understanding model can be reduced.

The technical solutions of the embodiments of this application are implemented as follows:

This application provides a method for training a semantic understanding model performed at an electronic device, including:
  obtaining a first training sample set, the first training sample set including sentence samples with noise obtained through an active learning process;
  performing denoising processing on the first training sample set to form a corresponding second training sample set;
  processing the second training sample set by using a semantic understanding model, to determine initial parameters of the semantic understanding model;
  processing the second training sample set by using the semantic understanding model in response to the initial parameters of the semantic understanding model, to determine update parameters of the semantic understanding model; and
  iteratively updating a semantic representation layer network parameter and a task-related output layer network parameter of the semantic understanding model by using the second training sample set and according to the update parameters of the semantic understanding model.

This application further provides a semantic processing method for a semantic understanding model, including:
  obtaining speech instruction information, and converting the speech instruction information into corresponding recognizable text information;
  determining at least one word-level hidden variable corresponding to the recognizable text information by using a semantic representation layer network of a semantic understanding model;
  determining an object matching the word-level hidden variable according to the at least one word-level hidden variable and by using an out-of-domain (OOD) detector network of the semantic understanding model;
  determining a task domain corresponding to the word-level hidden variable according to the at least one word-level hidden variable and by using a domain classification network of the semantic understanding model; and
  triggering a corresponding service process according to the object matching the word-level hidden variable and the task domain corresponding to the word-level hidden variable, to complete a task corresponding to the speech instruction information,
  the semantic understanding model being obtained through training based on the method described above.

The embodiments of this application further provide an electronic device, including:
  a memory, configured to store executable instructions; and
  a processor, configured to implement, when executing the executable instructions stored in the memory, the method for training a semantic understanding model described above.

The embodiments of this application further provide an electronic device, including:
  a memory, configured to store executable instructions; and
  a processor, configured to implement, when executing the executable instructions stored in the memory, the semantic processing method for a semantic understanding model described above.

The embodiments of this application further provide a non-transitory computer-readable storage medium, storing executable instructions, the executable instructions, when executed by a processor, implementing the method for training a semantic understanding model or the semantic processing method described above.

The embodiments of this application have the following beneficial effects:

According to the method, a first training sample set is obtained, the first training sample set including sentence samples with noise obtained through an active learning process; denoising processing is performed on the first training sample set to form a corresponding second training sample set; the second training sample set is processed by using a semantic understanding model, to determine initial parameters of the semantic understanding model; the second training sample set is processed by using the semantic understanding model in response to the initial parameters of the semantic understanding model, to determine update parameters of the semantic understanding model; and a semantic representation layer network parameter and a task-related output layer network parameter of the semantic understanding model are iteratively updated by using the second training sample set and according to the update parameters of the semantic understanding model. Therefore, the generalization ability of the semantic understanding model is enhanced and the training accuracy and training speed of the semantic understanding model are improved. In addition, the gain of the existing noise sentences in model training can be effectively and fully utilized, so that the semantic understanding model can adapt to different use scenarios, the impact of environmental noise on the semantic understanding model can be reduced, and invalid triggers of an electronic device can be reduced, which is conducive to the deployment of the semantic understanding model in a mobile terminal.

BRIEF DESCRIPTION OF THE DRAWINGS

To describe the technical solutions of the embodiments of this application or the related art more clearly, the following briefly introduces the accompanying drawings required for describing the embodiments or the related art. The accompanying drawings in the following description show merely some embodiments of this application, and a person of ordinary skill in the art may still derive other drawings from these accompanying drawings without creative efforts.

DESCRIPTION OF EMBODIMENTS

Figure 1:
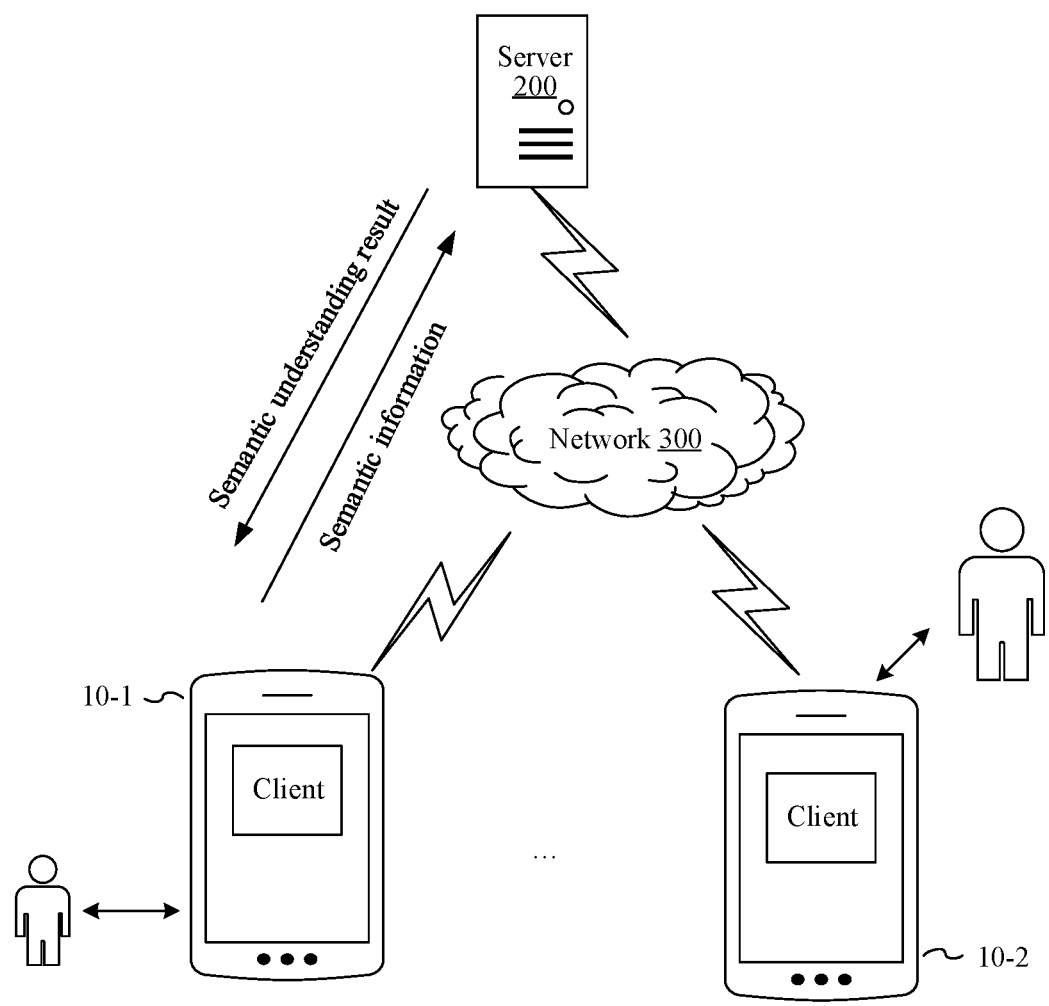
FIG. 1 is a schematic diagram of a use scenario of a method for training a semantic understanding model according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, the term "some embodiments" describes subsets of all possible embodiments, but it may be understood that "some embodiments" may be the same subset or different subsets of all the possible embodiments, and can be combined with each other without conflict.

Before the embodiments of this application are further described in detail, a description is made on terms in the embodiments of this application, and the terms in the embodiments of this application are applicable to the following explanations.

1) Machine reading comprehension is an automatic question and answer technology that uses text questions and related documents as input and text answers as output.

2) Bidirectional encoder representations from transformers (BERT) is a language model training method using massive text. This method is widely used in a variety of natural language processing tasks, such as text classification, text matching, and machine reading comprehension.

3) An artificial neural network (neural network (NN) for short) is a mathematical model or calculation model that imitates biological neural network structures and functions in the field of machine learning and cognitive science, and is used to estimate or approximate functions.

4) A model parameter is a quantity that uses common variables to establish a relationship between functions and variables. In artificial neural networks, model parameters are usually real matrices.

5) Application programming interfaces (API) may be understood semantically as application interfaces, which are some predefined functions, or agreements of connection of different components of a software system. An objective of the API is to provide a capability for an application program and a developer to access a set of routines based on specific software or hardware without accessing source code or understanding details of an internal working mechanism.

6) A software development kit (SDK) may be understood semantically as a set of development kits used for creating application software for a specified software package, a specified software framework, a specified hardware platform, a specified operating system, and the like, and generally includes a set of related documents, examples, and tools that assist in the development of a certain type of software.

7) A generative adversarial network (GAN) is a method of unsupervised learning in which learning is performed by causing two neural networks play against each other, and generally includes a generation network and a discriminative network. The generation network randomly samples from a latent space as input, and an output result thereof needs to imitate a real sample in a training set as much as possible. An input of the discriminative network is the real sample or the output of the generation network, and the purpose thereof is to distinguish the output of the generation network from the real sample as much as possible. The generation network needs to deceive the discriminative network as much as possible. The two networks confront each other and constantly adjust parameters thereof. The ultimate goal is to cause the discriminative network unable to determine whether the output of the generated network is real.

8) Full duplex enables, in a human-computer interactive dialog scenario, an intelligent assistant to have an interactive ability to listen while thinking and interrupt at any time based on streaming speech and semantic technologies without the need for repeated wakeup.

9) Natural language understanding (NLU) extracts semantic information from words of a user in a dialog system, and includes domain intention recognition and slot filling.

10) Multi-task learning is a training method (also referred to as joint learning) in which joint learning and optimization of a plurality of related tasks are performed at the same time in the field of machine learning to achieve better model accuracy than a single task, and a plurality of tasks help each other by sharing representation layers.

11) Active learning: In supervised learning, a machine learning model learns a mapping relationship between data and prediction results by fitting training data, and active learning selects sample data with the largest amount of information for the model to label by designing a data sampling method. Compared with a random sampling method, after the labeled data is re-added to the sample training, the gain of the model is the largest.

12) Out of domain (OOD): For a task-oriented dialog system, a plurality of vertical domains are usually predefined such as weather checking, navigation, and music, to meet task requirements of a user. User queries that do not fall into any task-oriented domain are OOD corpus, such as small talk, knowledge question and answer, and semantic understanding errors. The opposite is in domain (IND) corpus, which are corpus belonging to any predefined domain.

13) A false acceptance rate (FAR) is a proportion of OOD corpus that is misidentified in any field in all OOD corpus. This indicator reflects a misrecognition rate of the intelligent assistant, and a lower indicator indicates better. In a full-duplex scenario, there are strict restrictions on this indicator, and the indicator needs to be at a very low level.

14) A false rejection rate (FRR) is a proportion of a quantity of corpora that has not been recalled by any domain to a quantity of all IND corpora. The indicator reflects a rejection rate of the intelligent assistant, and a lower indicator indicates better.

15) Speech translation, also referred to as automatic speech and semantic understanding, is a technology that uses a computer to understand phonetic semantics of a natural language into text or speech in another natural language, and may generally include two stages of semantic understanding and machine semantic understanding.

FIG. 1 is a schematic diagram of a use scenario of a method for training a semantic understanding model according to an embodiment of this application. Referring to FIG. 1, semantic understanding software clients are configured on terminals (including a terminal 10-1 and a terminal 10-2). The user may input a corresponding sentence to be understood semantically by using the semantic understanding software client, and a chat client may receive a corresponding semantic understanding result and display the received semantic understanding result to the user. The terminals are connected to a server 200 through a network 300. The network 300 may be a wide area network or a local area network, or a combination thereof, which uses a radio link to implement data transmission.

In an example, the server 200 is configured to deploy the semantic understanding model and train the semantic understanding model to iteratively update a semantic representation layer network parameter and a task-related output layer network parameter of the semantic understanding model, to generate a semantic understanding result for a target sentence to be understood semantically through a semantic representation layer network and a task-related output layer network in the semantic understanding model; and display, through the terminals (the terminal 10-1 and/or the terminal 10-2), the semantic understanding result generated by the semantic understanding model and corresponding to the sentence to be understood semantically.

Certainly, before processing the target sentence to be understood semantically by using the semantic understanding model to generate the corresponding semantic understanding result, the semantic understanding model needs to be trained. In some embodiments of this application, the method may include: obtaining a first training sample set, the first training sample set including sentence samples with noise obtained through an active learning process; performing denoising processing on the first training sample set to form a corresponding second training sample set; processing the second training sample set by using a semantic understanding model, to determine initial parameters of the semantic understanding model; processing the second training sample set by using the semantic understanding model in response to the initial parameters of the semantic understanding model, to determine update parameters of the semantic understanding model; and iteratively updating a semantic representation layer network parameter and a task-related output layer network parameter of the semantic understanding model by using the second training sample set and according to the update parameters of the semantic understanding model.

Figure 2:
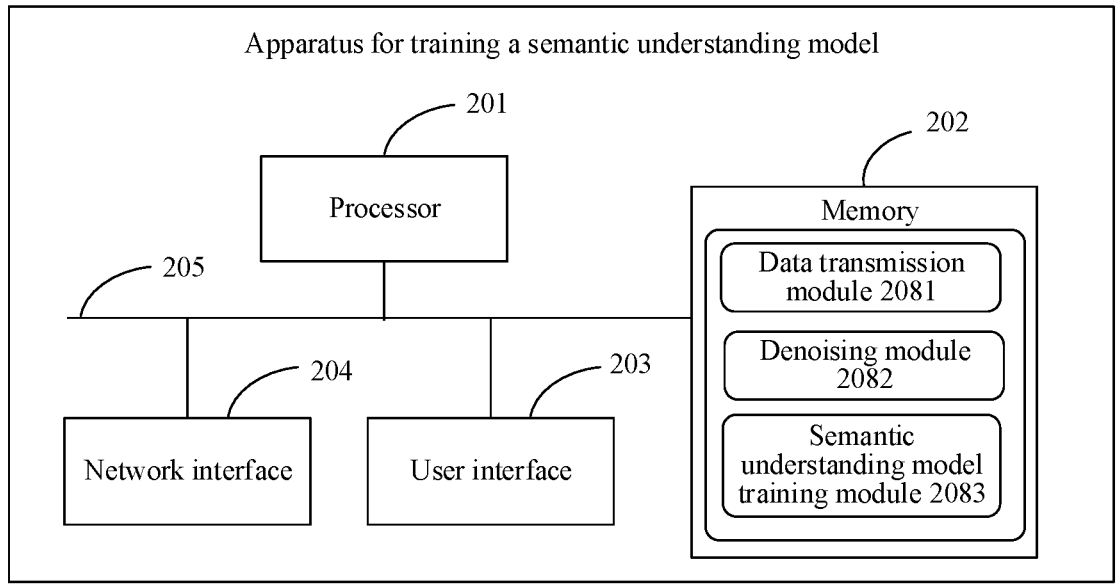
FIG. 2 is a schematic diagram of a composition structure of an apparatus for training a semantic understanding model according to an embodiment of this application.

The following describes a structure of an apparatus for training a semantic understanding model according to the embodiments of this application in detail. The apparatus for training a semantic understanding model may be implemented in various forms, for example, a dedicated terminal with a semantic understanding model training function, or a server with the semantic understanding model training function, for example, the foregoing server 200 in FIG. 1. FIG. 2 is a schematic diagram of a composition structure of an apparatus for training a semantic understanding model according to an embodiment of this application. It may be understood that FIG. 2 only shows the exemplary structure of the apparatus for training a semantic understanding model rather than the entire structure. A part of the structure or the entire structure shown in FIG. 2 may be implemented as required.

The apparatus for training a semantic understanding model provided in this embodiment of this application includes: at least one processor 201, a memory 202, a user interface 203, and at least one network interface 204. Various components in the apparatus 20 for training a semantic understanding model are coupled together through a bus system 205. It may be understood that the bus system 205 is configured to implement connection and communication between these assemblies. In addition to a data bus, the bus system 205 further includes a power bus, a control bus, and a state signal bus. However, for ease of clear description, all types of buses are labeled as the bus system 205 in FIG. 2.

The user interface 203 may include a display, a keyboard, a mouse, a track ball, a click wheel, a key, a button, a touch panel, a touchscreen, or the like.

It may be understood that, the memory 202 may be a volatile memory or a non-volatile memory, or may include both a volatile memory and a non-volatile memory. The memory 202 in this embodiment of this application can store data to support operation of the terminal (for example, 10-1). Examples of these types of data include any computer program to be operated on the terminal (for example, 10-1), for example, an operating system and an application program. The operating system includes various system programs, such as a framework layer, a kernel library layer, and a driver layer, which are configured to implement various basic services and process a task based on hardware. The application program may include various application programs.

In some embodiments, the apparatus for training a semantic understanding model provided in the embodiments of this application may be implemented by a combination of software and hardware. For example, the apparatus for training a semantic understanding model provided in the embodiments of this application may be a processor in the form of a hardware decoding processor, and is programmed to perform the method for training a semantic understanding model provided in the embodiments of this application. For example, the processor in the form of a hardware decoding processor may use one or more ASICs, digital signal processor (DSP), programmable logic devices (PLDs), complex programmable logic device (CPLD), FPGAs, or other electronic elements.

For example, the apparatus for training a semantic understanding model provided in the embodiments of this application is implemented by a combination of software and hardware. The apparatus for training a semantic understanding model provided in the embodiments of this application may be directly embodied as a combination of software modules executed by the processor 201. The software module may be located in a storage medium, the storage medium is located in the memory 202, and the processor 201 reads executable instructions included in the software module in the memory 202. The method for training a semantic understanding model provided in the embodiments of this application is completed in combination with necessary hardware (for example, includes a processor 201 and another assembly connected to the bus 205).

For example, the processor 201 may be an integrated circuit chip, and has a signal processing capability, for example, a general-purpose processor, a digital signal processor (DSP), or another programmable logical device, a discrete gate or a transistor logical device, or a discrete hardware component. The general-purpose processor may be a microprocessor, any conventional processor, or the like.

In an example in which the apparatus for training a semantic understanding model provided in the embodiments of this application is implemented by hardware, the apparatus provided in the embodiments of this application may be directly executed by using the processor 201 in the form of a hardware decoding processor, for example, one or more ASICs, DSPs, PLDs, CPLDs, FPGAs, or other electronic elements, to execute the method for training a semantic understanding model provided in the embodiments of this application.

The memory 202 in this embodiment of this application is configured to store various types of data to support operation of the apparatus 20 for training a semantic understanding model. Examples of these types of data include any executable instruction to be operated on the apparatus 20 for training a semantic understanding model, for example, an executable instruction. A program for implementing the method for training a semantic understanding model of the embodiments of this application may be included in the executable instruction.

In some other embodiments, the apparatus for training a semantic understanding model provided in the embodiments of this application may be implemented by software. FIG. 2 shows the apparatus for training a semantic understanding model stored in the memory 202, which may be software in the form of a program and a plug-in and includes a series of modules. An example of a program stored in the memory 202 may include an apparatus for training a semantic understanding model. The apparatus for training a semantic understanding model includes the following software modules: a data transmission module 2081, a denoising module 2082, and a semantic understanding model training module 2083. When the software modules in the apparatus for training a semantic understanding model are read by the processor 201 into a RAM for execution, the method for training a semantic understanding model provided in the embodiments of this application is implemented. Functions of the software modules in the apparatus for training a semantic understanding model according to the embodiments of this application are described below, where the data transmission module 2081 is configured to obtain a first training sample set, the first training sample set including sentence samples with noise obtained through an active learning process;

the denoising module 2082 is configured to perform denoising processing on the first training sample set to form a corresponding second training sample set;

the semantic understanding model training module 2083 is configured to process the second training sample set by using a semantic understanding model, to determine initial parameters of the semantic understanding model;

the semantic understanding model training module 2083 is configured to process the second training sample set by using the semantic understanding model in response to the initial parameters of the semantic understanding model, to determine update parameters of the semantic understanding model; and the semantic understanding model training module 2083 is configured to iteratively update a semantic representation layer network parameter and a task-related output layer network parameter of the semantic understanding model by using the second training sample set and according to the update parameters of the semantic understanding model.

Figure 3:
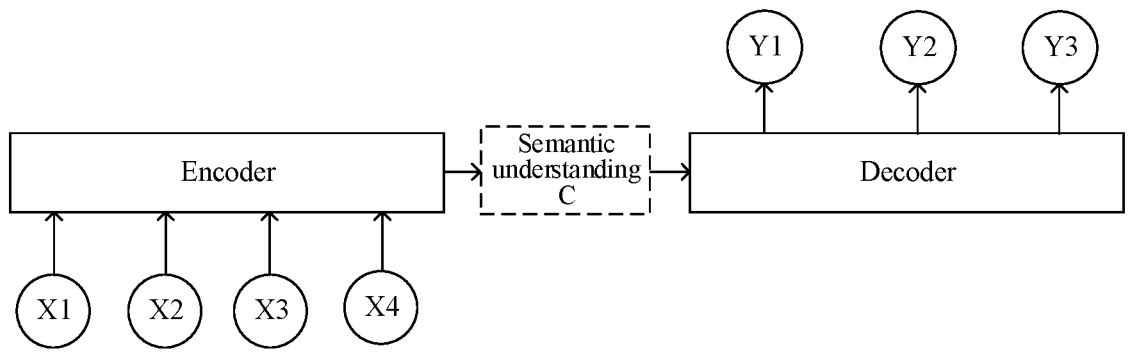
FIG. 3 is a schematic diagram of generating a semantic understanding result by using a sequence to sequence (seq2seq) model based on a recurrent neural network (RNN).

The method for training a semantic understanding model provided in the embodiments of this application is described with reference to the apparatus 20 for training a semantic understanding model shown in FIG. 2. Before the method for training a semantic understanding model provided in the embodiments of this application is described, the process in which the semantic understanding model according to this application generates the corresponding semantic understanding result according to the sentence to be understood semantically. FIG. 3 is a schematic diagram of generating a semantic understanding result in the conventional solution. A seq2seq model is an architecture manner represented by an encoder and a decoder. The seq2seq model generates an output sequence Y according to an input sequence X. In the seq2seq model represented by the encoder and the decoder, the encoder converts an input sequence into a fixed-length vector, and the decoder decodes the inputted fixed-length vector into an output sequence. As shown in FIG. 3, the encoder encodes an inputted sentence to be understood semantically, to obtain a text feature of the sentence to be understood semantically; and the decoder decodes the text feature and outputs a corresponding semantic understanding result, where the encoder and decoder are in a one-to-one correspondence.

As can be seen, for the related art shown in FIG. 3, the disadvantage of the semantic understanding model based on the seq2seq model is that the model in the related art only establishes a one-to-one relationship between training data target text y and labeling information, and uses MLE to optimize the model, and consequently, the model generates many high-frequency general responses that are often meaningless and short. Meanwhile, in many actual scenarios, the same target text y may have a variety of labeling information. The existing seq2seq model has a one-to-one correspondence between the encoder and the decoder, and thus cannot effectively deal with this one-to-many problem. In addition, the seq2seq model is easily disturbed by noise information to trigger useless recognition, which leads to poor user experience.

Figure 4:
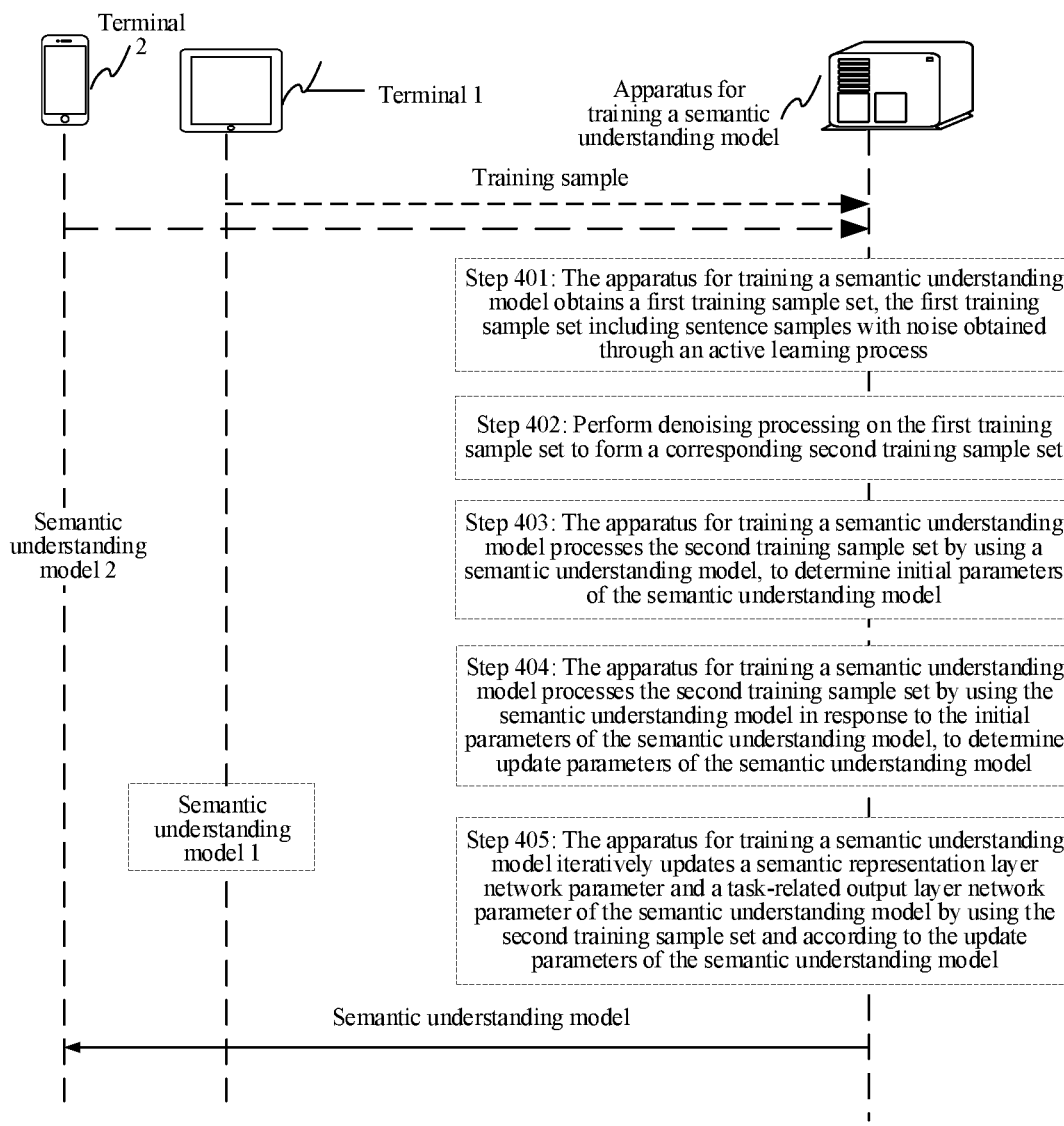
FIG. 4 is a schematic flowchart of a method for training a semantic understanding model according to an embodiment of this application.

To resolve the defect in the related art, reference is made to FIG. 4, which is a schematic flowchart of a method for training a semantic understanding model according to an embodiment of this application. It may be understood that the steps shown in FIG. 4 may be executed by various electronic devices running the apparatus for training a semantic understanding model, for example, may be a dedicated terminal with a sample generation function, a server with a semantic understanding model training function, or a server cluster. The following describes the steps shown in FIG. 4.

Step 401: The apparatus for training a semantic understanding model obtains a first training sample set, the first training sample set including sentence samples with noise obtained through an active learning process.

In some embodiments of this application, the first training sample set may be language samples of the same language, or may be language samples of different languages, which is not limited. The language of the first training sample set may be set according to actual translation requirements. For example, when a translation model is applied to a Chinese-to-English application scenario, the language of the first training sample set may be Chinese. In another example, when the translation model is applied to an English-to-French application scenario, the language of the first training sample set may be English. In still another example, when the translation model is applied to an application scenario of Chinese-French mutual translation, the language of the first training sample set may include Chinese and/or French.

In some embodiments of this application, the first training sample set may be in a form of speech or text. The first training sample set in the text form and/or the first training sample set in the speech form may be pre-collected. For example, the first training sample set in the text form and/or the first training sample set in the speech form may be collected in a general sentence collection manner, and the collected first training sample set in the text form and/or the first training sample set in the speech form are stored in a preset storage device. Therefore, in this application, during training of the translation model, the first training sample set may be obtained from the storage device.

Step 402: Perform denoising processing on the first training sample set to form a corresponding second training sample set.

In some embodiments of this application, the performing denoising processing on the first training sample set to form a corresponding second training sample set may be implemented in the following manner:

determining a dynamic noise threshold matching a use environment of the semantic understanding model; and performing denoising processing on the first training sample set according to the dynamic noise threshold, to form the second training sample set matching the dynamic noise threshold. Due to different use environments of the translation model, dynamic noise thresholds matching the use environments of the translation model are also different. For example, in a use environment of academic translation, a dynamic noise threshold matching the use environment of the translation model needs to be less than a dynamic noise threshold in an article reading environment.

In some embodiments of this application, the performing denoising processing on the first training sample set to form a corresponding second training sample set may be implemented in the following manner:

determining a fixed noise threshold corresponding to the semantic understanding model; and performing denoising processing on the first training sample set according to the fixed noise threshold, to form the second training sample set matching the fixed noise threshold. When the translation model is solidified in a corresponding hardware mechanism such as an in-vehicle terminal, and the use environment is spoken translation, due to the undiversified noise, the fixed noise threshold corresponding to the fixed translation model can effectively improve the training speed of the translation model and reduce the waiting time of the user.

Step 403: The apparatus for training a semantic understanding model processes the second training sample set by using a semantic understanding model, to determine initial parameters of the semantic understanding model.

Step 404: The apparatus for training a semantic understanding model processes the second training sample set by using the semantic understanding model in response to the initial parameters of the semantic understanding model, to determine update parameters of the semantic understanding model.

In some embodiments of this application, the processing the second training sample set by using the semantic understanding model in response to the initial parameters of the semantic understanding model, to determine update parameters of the semantic understanding model may be implemented in the following manner:

substituting different sentence samples in the second training sample set into a loss function corresponding to a task-related output layer network formed by an OOD detector network and a domain classification network of the semantic understanding model; and determining a corresponding OOD detector network parameter and a corresponding domain classification network parameter in the semantic understanding model as the update parameters of the semantic understanding model when the loss function meets a corresponding convergence condition. The semantic understanding model may include: a semantic representation layer network and a task-related output layer network. Further, the task-related output layer network includes an OOD detector network and a domain classification network.

Figure 5:
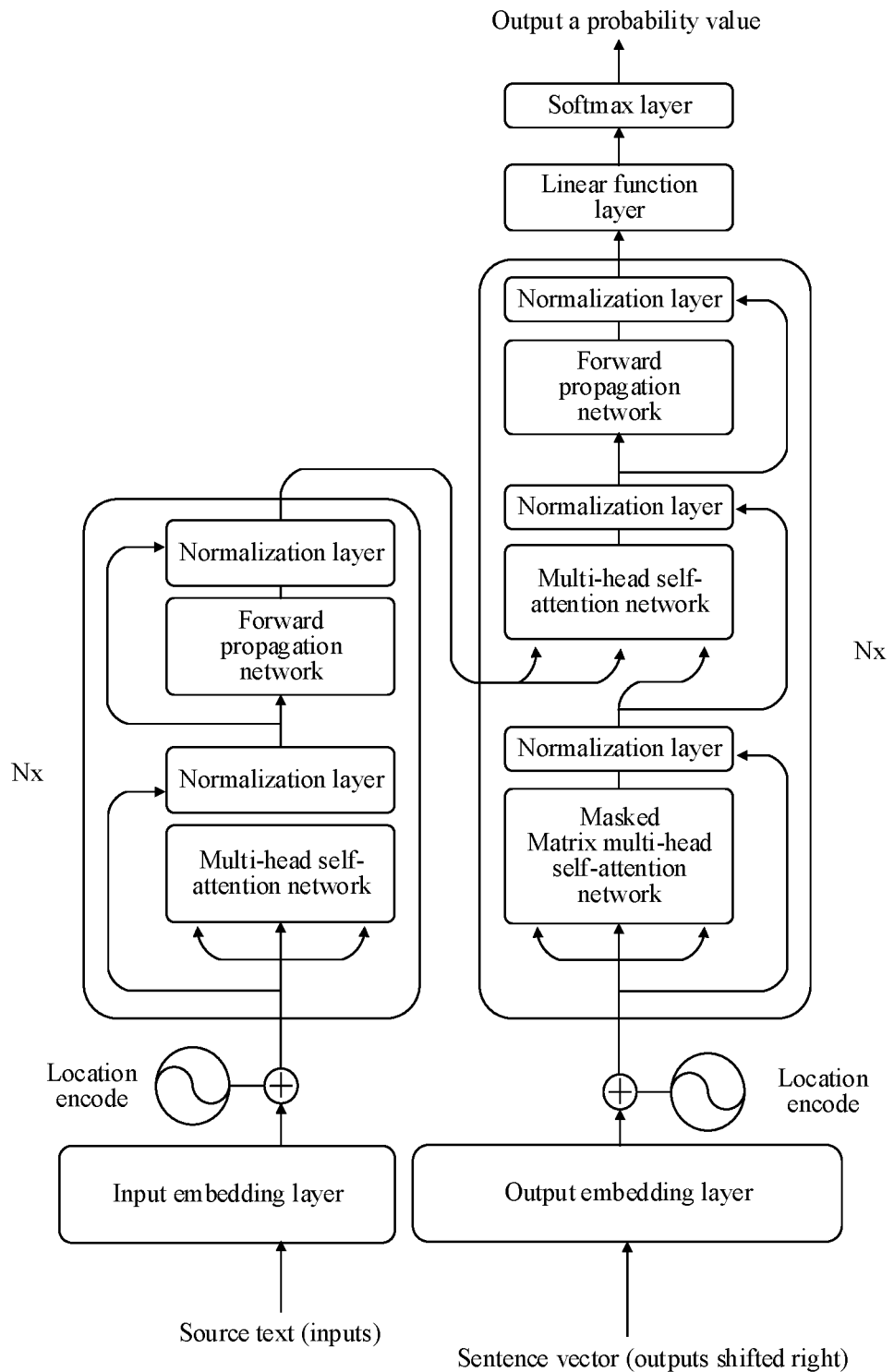
FIG. 5 is a schematic structural diagram of a semantic representation layer network model according to an embodiment of this application.

In some embodiments of this application, the semantic representation layer network may be a BERT model. FIG. 5 is a schematic structural diagram of a semantic representation layer network model according to an embodiment of this application. The encoder includes: N=6 identical layers, where each layer includes two sub-layers. The first sub-layer is a multi-head attention layer and the second sub-layer is a simple fully connected layer. Residual connection and normalization are added to each sub-layer.

The decoder includes N=6 identical layers, where the layer is not the same as the encoder. The layer herein includes three sub-layers, including a self-attention layer, an encoder-decoder attention layer, and a fully connected layer. The first two sub-layers are based on the multi-head attention layer.

Figure 6:
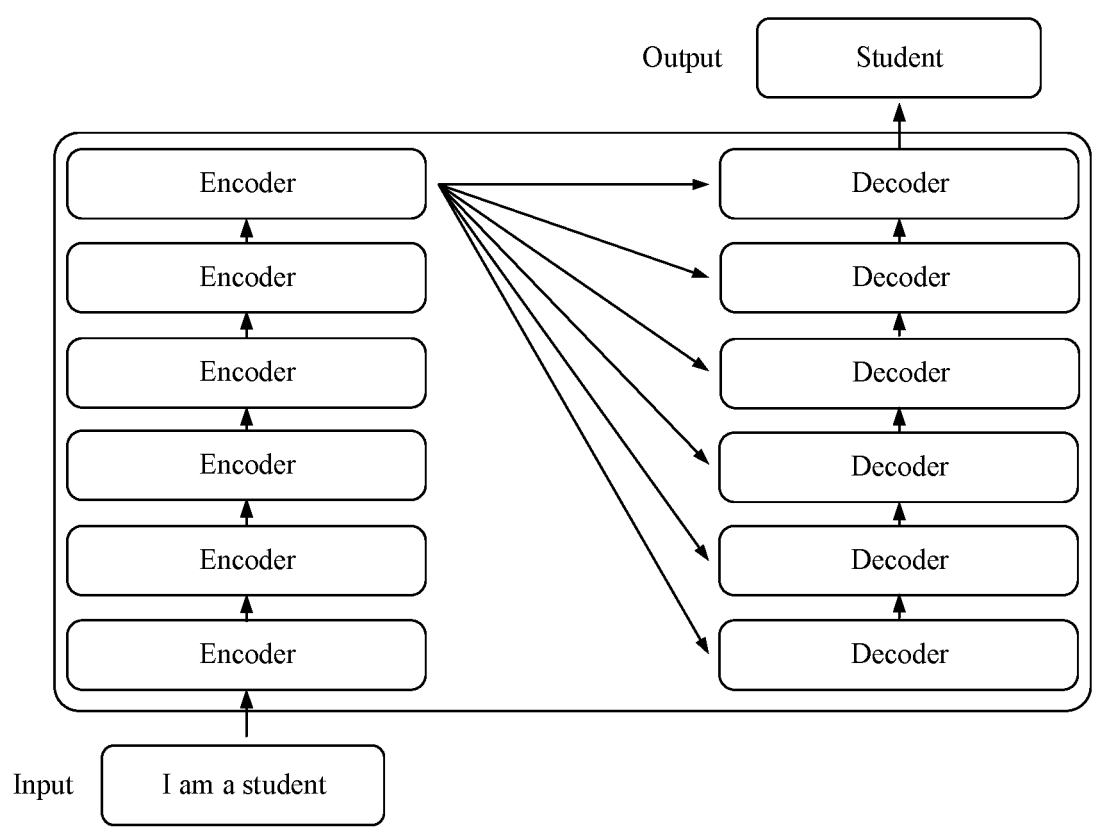
FIG. 6 is a schematic diagram of word-level machine reading of a semantic representation layer network model according to an embodiment of this application.

FIG. 6 is a schematic diagram of word-level machine reading of a semantic representation layer network model according to an embodiment of this application. There are six encoders and six decoders. The inputs into the first encoder combine embedding and positional embedding. The inputs are then outputted to each decoder among the decoders after passing through six encoders. An input target "I am a student t" is processed by the semantic representation layer network model, and an outputted machine reading result is "student".

Figure 7:
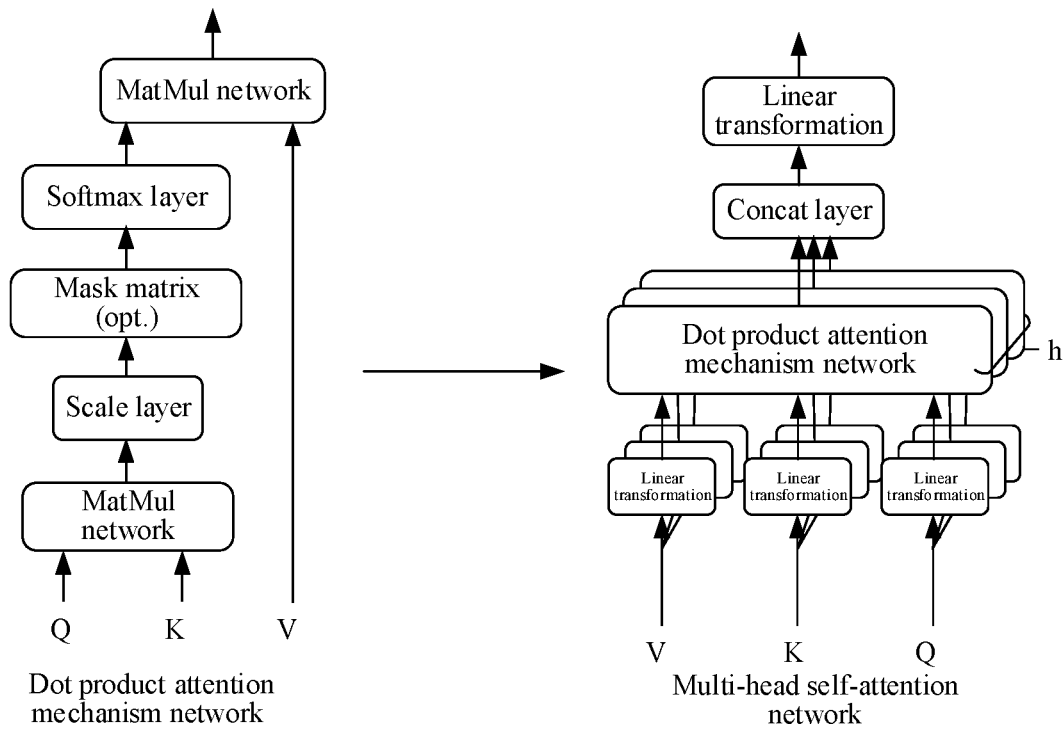
FIG. 7 is a schematic structural diagram of an encoder of a semantic representation layer network model according to an embodiment of this application.

FIG. 7 is a schematic structural diagram of an encoder of a semantic representation layer network model according to an embodiment of this application. The inputs include a query (Q) and a key (K) of a dimension d and a value (V) of a dimension d. All keys calculate a dot product of the query and the softmax function is used to obtain a weight of the value.

FIG. 7 is a schematic vector diagram of an encoder of a semantic representation layer network model according to an embodiment of this application. Q, K, and V are obtained by multiplying a vector x inputted into the encoder with W^Q, W^K, and W^V. The dimensions of W^Q, W^K, and W^V in the article are (512, 64). It is assumed that the dimension of the inputs is (m, 512), where m represents a quantity of words. Therefore, the dimension of Q, K, and V obtained by multiplying the inputted vector with W^Q, W^K, and W^V is (m, 64).

Figure 8:
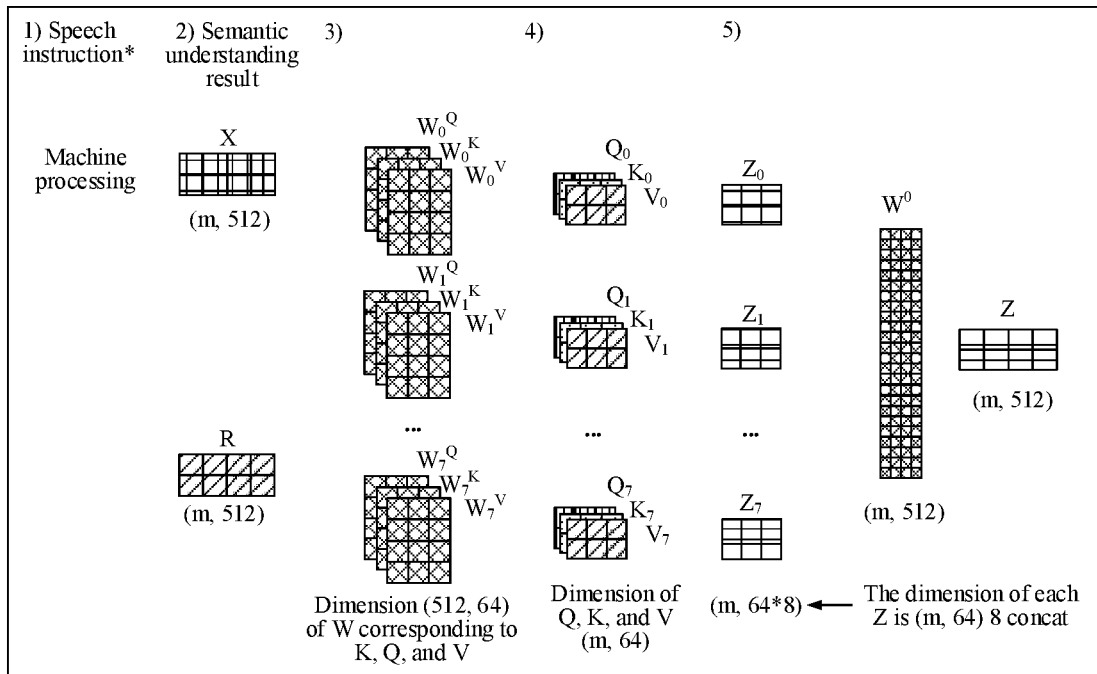
FIG. 8 is a schematic diagram of vector concatenation of an encoder of a semantic representation layer network model according to an embodiment of this application.

FIG. 8 is a schematic diagram of vector concatenation of an encoder of a semantic representation layer network model according to an embodiment of this application. Z0 to Z7 are eight corresponding parallel heads (a dimension thereof is (m, 64)), and the eight heads are concatenated to obtain the dimension (m, 512). Finally, the heads are multiplied with W^O to obtain an output matrix with the dimension (m, 512), and the dimension of the matrix is consistent with the dimension of entering the next encoder.

Figure 9:
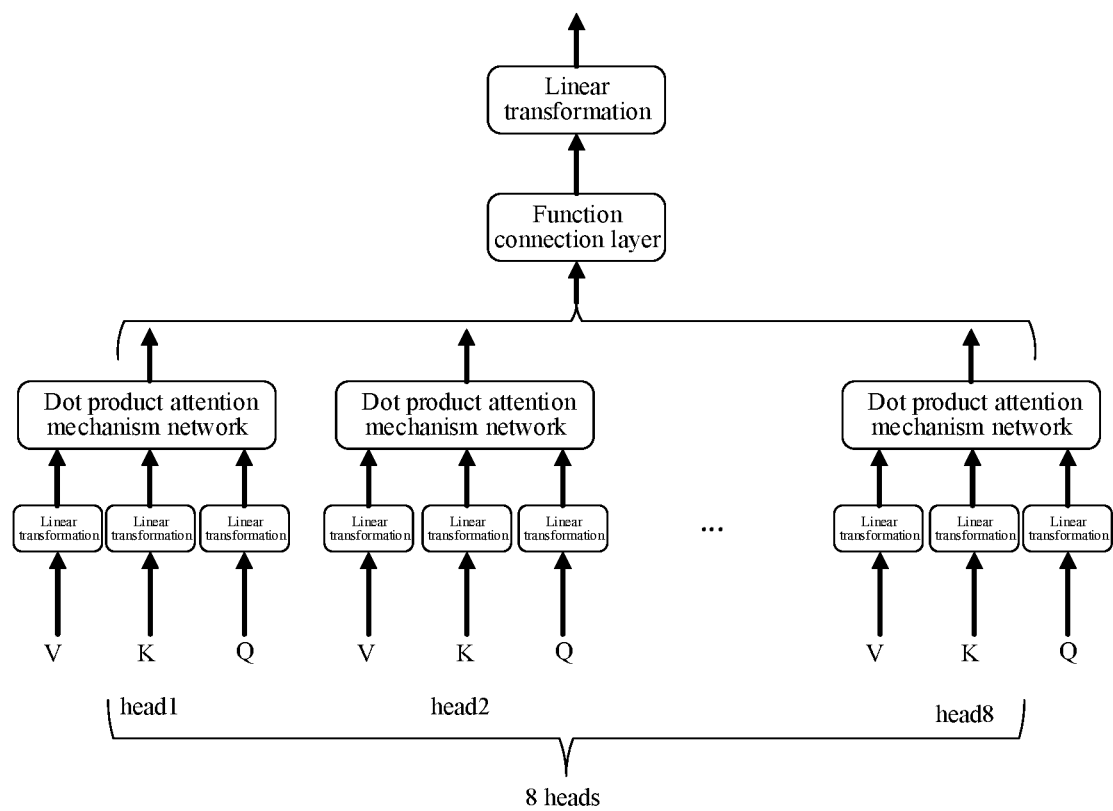
FIG. 9 is a schematic diagram of an encoding process of an encoder of a semantic representation layer network model according to an embodiment of this application.

FIG. 9 is a schematic diagram of an encoding process of an encoder of a semantic representation layer network model according to an embodiment of this application. x1 passes the self-attention to a state of z1. A tensor that has passed the self-attention needs to be processed by the residual network and LaterNorm, and then enters a fully connected feedforward network. The feedforward network needs to perform the same operation of residual processing and normalization. The finally outputted tensor may then enter the next encoder. This operation is iterated for six times, and a result of the iterative processing enters the decoder.

Figure 10:
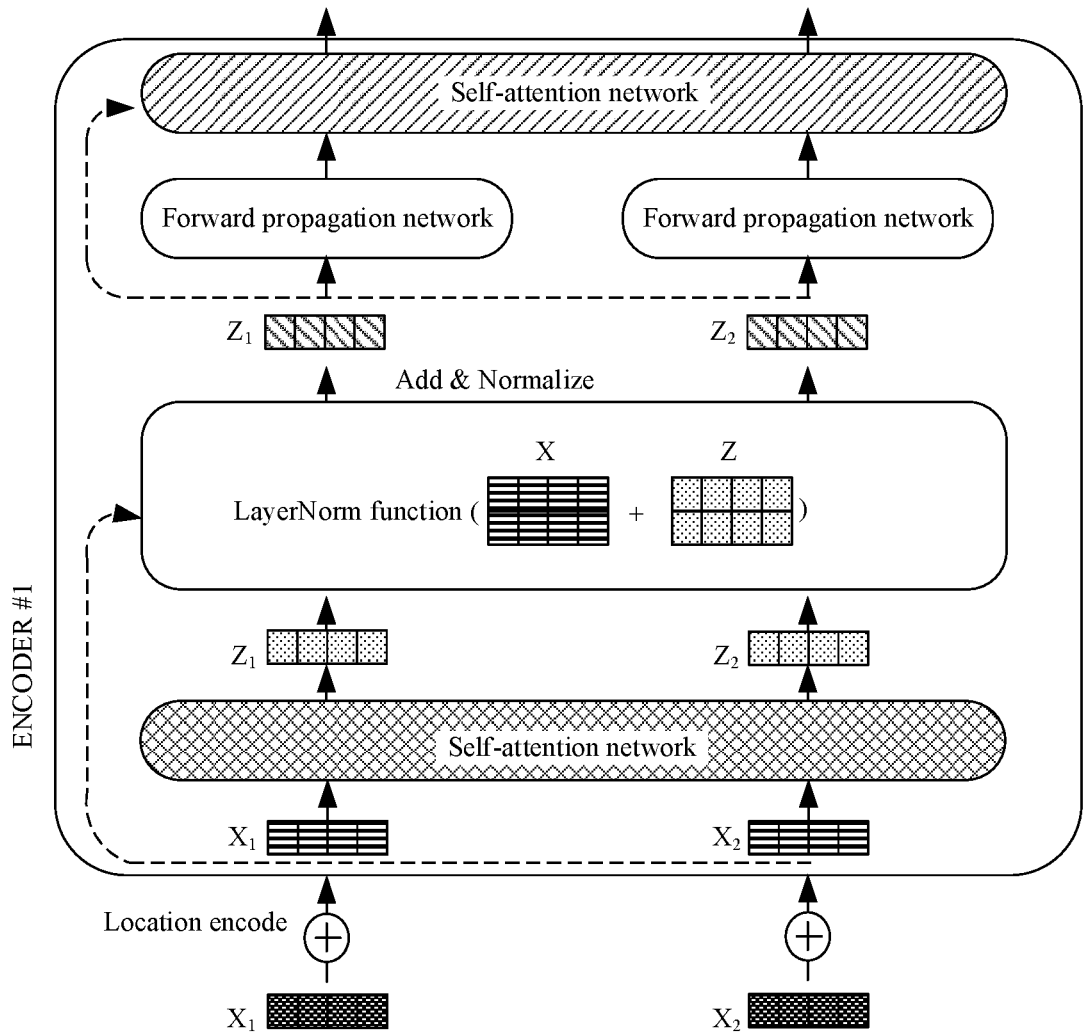
FIG. 10 is a schematic diagram of a decoding process of a decoder of a semantic representation layer network model according to an embodiment of this application.

FIG. 10 is a schematic diagram of a decoding process of a decoder of a semantic representation layer network model according to an embodiment of this application. The input and the output, and the decoding process of the decoder are as follows:

Output: a probability distribution of an output word corresponding to a position i;

Input: an output of the encoder & an output of a decoder corresponding to a position i-1. Therefore, the middle attention is not self-attention, K and V thereof come from the encoder, and Q comes from an output of a decoder at a previous position.

Figure 11:
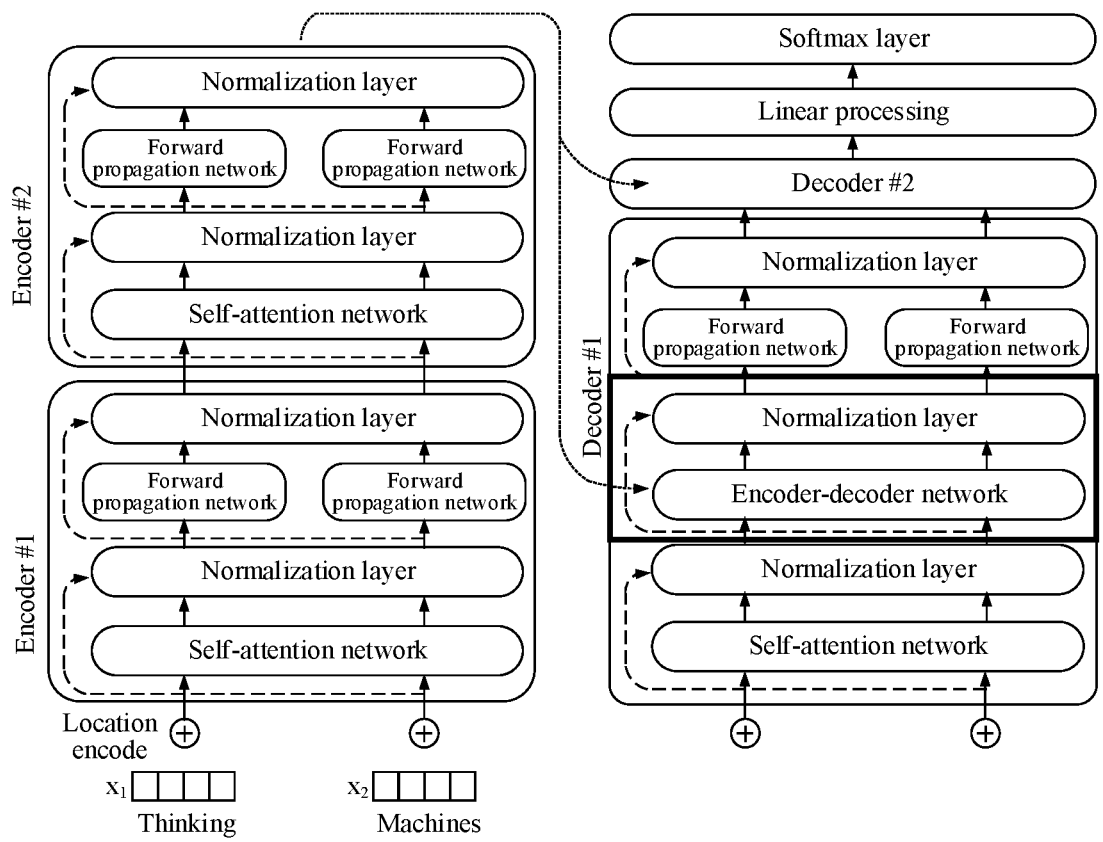
FIG. 11 is a schematic diagram of a decoding process of a decoder of a semantic representation layer network model according to an embodiment of this application.
Figure 12:
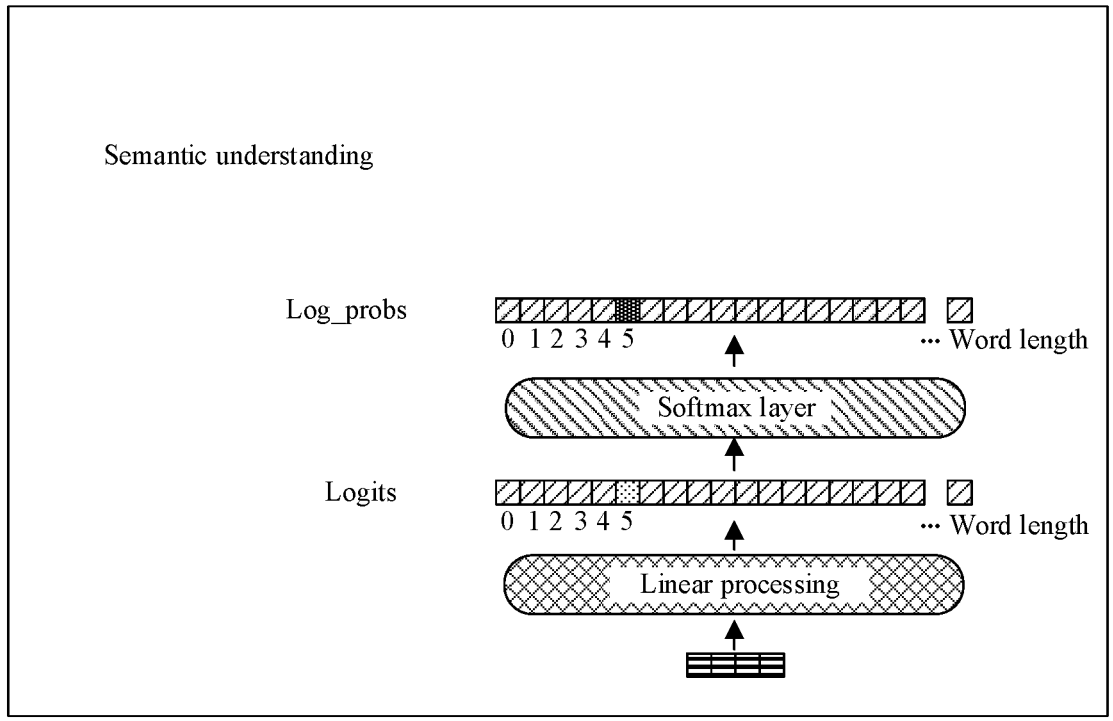
FIG. 12 is a schematic diagram of a decoding process of a decoder of a semantic representation layer network model according to an embodiment of this application.

Referring to FIG. 11 and FIG. 12, FIG. 11 is a schematic diagram of a decoding process of a decoder of a semantic representation layer network model according to an embodiment of this application. A vector outputted by a last decoder of the decoder network passes through a Linear layer and a softmax layer. FIG. 12 is a schematic diagram of a decoding process of a decoder of a semantic representation layer network model according to an embodiment of this application. The function of the Linear layer is to map the vector from the decoder part into a logits vector. The softmax layer then converts the vector into a probability value according to the logits vector. Finally, a position of the maximum probability is found, thereby completing the output of the decoder.

In some embodiments of this application, a first reading semantic labeling network may be a BERT model. FIG. 5 is a schematic structural diagram of a semantic representation layer network model according to an embodiment of this application. The encoder includes: N=6 identical layers, where each layer includes two sub-layers. The first sub-layer is a multi-head attention layer and the second sub-layer is a simple fully connected layer. Residual connection and normalization are added to each sub-layer.

The decoder includes N=6 identical layers, where the layer is not the same as the encoder. The layer herein includes three sub-layers, including a self-attention layer, an encoder-decoder attention layer, and a fully connected layer. The first two sub-layers are based on the multi-head attention layer.

Figure 13:
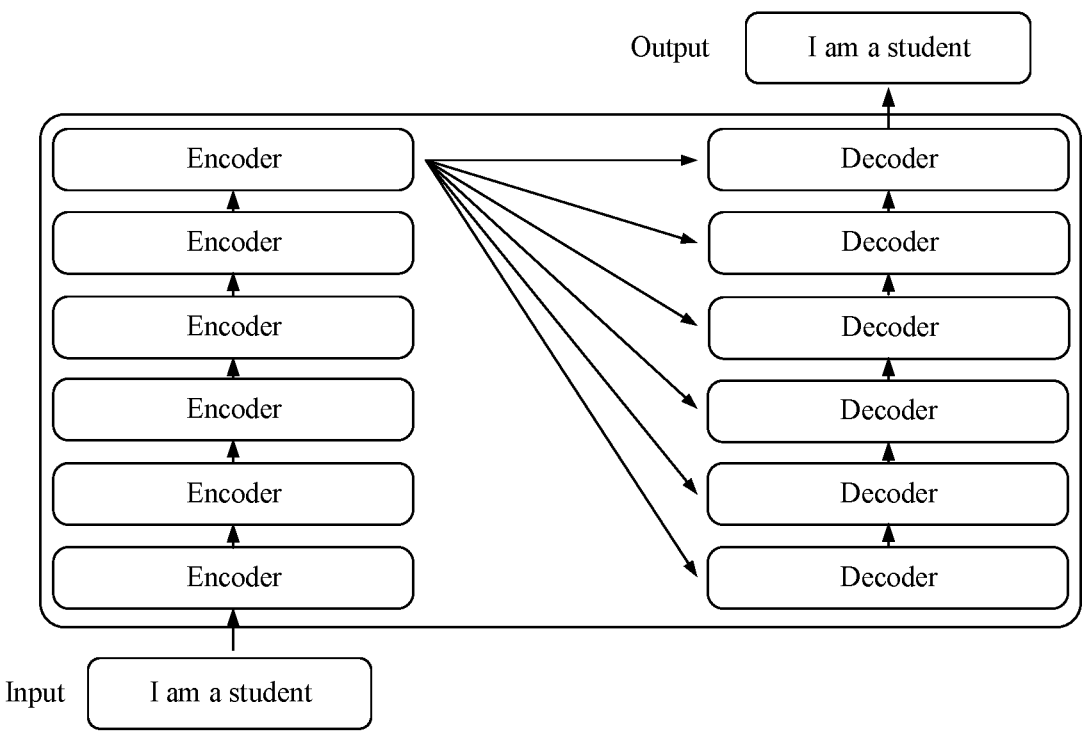
FIG. 13 is a schematic diagram of sentence-level machine reading of a semantic representation layer network model according to an embodiment of this application.

FIG. 13 is a schematic diagram of sentence-level machine reading of a semantic representation layer network model according to an embodiment of this application. There are six encoders and six decoders. The inputs into the first encoder combine embedding and positional embedding. The inputs are then outputted to each decoder among the decoders after passing through six encoders. An input target "I am a student t" is processed by the semantic representation layer network model, and an outputted machine reading result is "I am a student".

Certainly, the BERT model in this application may alternatively be replaced with a bi-directional long short-term memory (Bi-LSTM), a gated recurrent unit (GRU) model, an embedding from language model (ELMo), a GPT model, or a GPT2 model, and the details are not repeated in this application.

Step 405: The apparatus for training a semantic understanding model iteratively updates a semantic representation layer network parameter and a task-related output layer network parameter of the semantic understanding model by using the second training sample set and according to the update parameters of the semantic understanding model.

Figure 14:
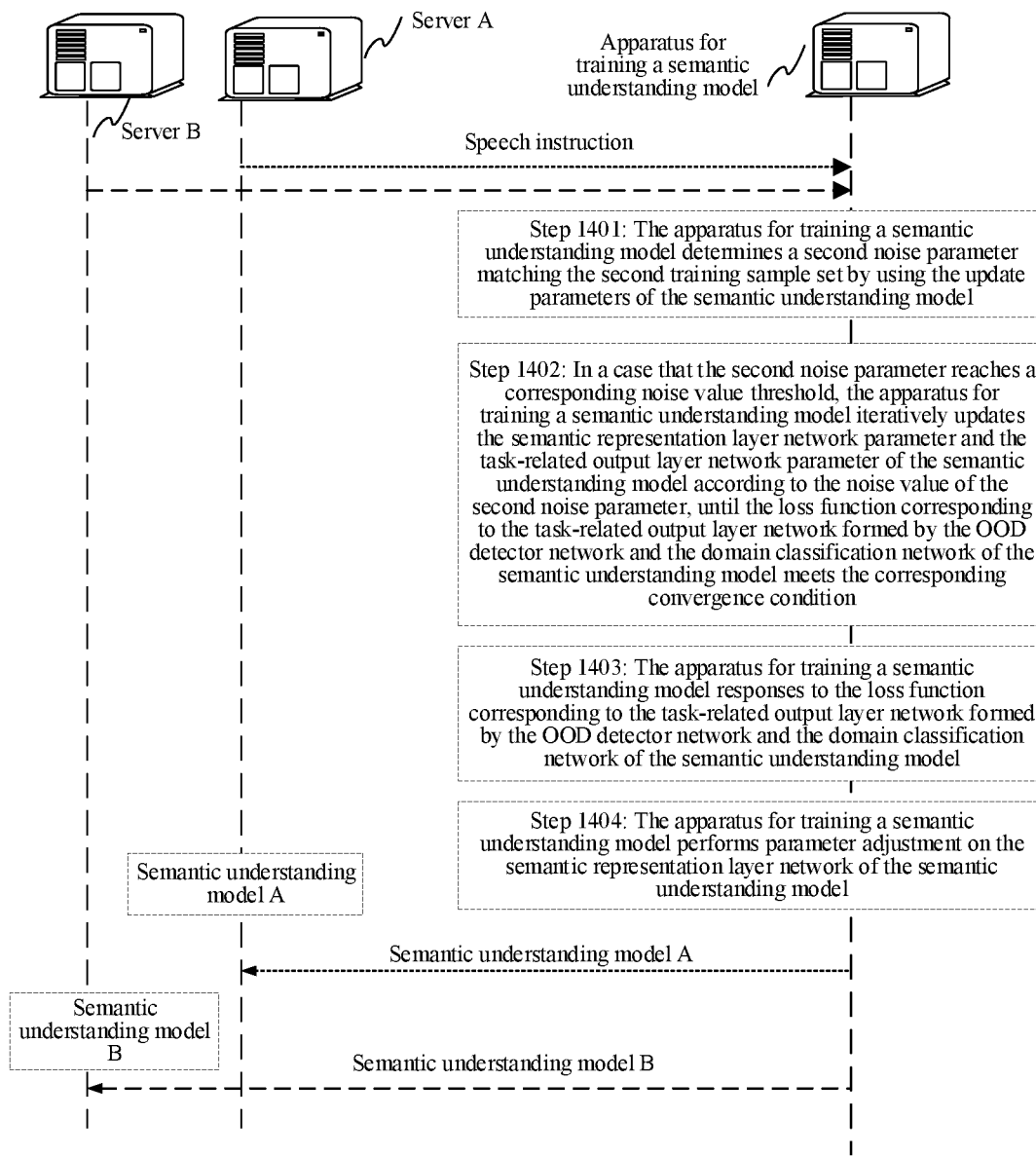
FIG. 14 is a schematic flowchart of a method for training a semantic understanding model according to an embodiment of this application.

FIG. 14 is a schematic flowchart of a method for training a semantic understanding model according to an embodiment of this application. It may be understood that the steps shown in FIG. 14 may be executed by various electronic devices running the apparatus for training a semantic understanding model, for example, may be a dedicated terminal with a semantic understanding model training function, a server with a semantic understanding model training function, or a server cluster. The following describes the steps shown in FIG. 14.

Step 1401: The apparatus for training a semantic understanding model determines a second noise parameter matching the second training sample set by using the update parameters of the semantic understanding model.

The second noise parameter is configured to represent a noise value of a parallel sentence sample in the second training sample set. Each training sample in the second training sample set has the same weight, and the training samples with the same weight may be referred to as parallel sentence samples.

Step 1402: In a case that the second noise parameter reaches a corresponding noise value threshold, the apparatus for training a semantic understanding model iteratively updates the semantic representation layer network parameter and the task-related output layer network parameter of the semantic understanding model according to the noise value of the second noise parameter, until the loss function corresponding to the task-related output layer network formed by the OOD detector network and the domain classification network of the semantic understanding model meets the corresponding convergence condition.

Step 1403: The apparatus for training a semantic understanding model responses to the loss function corresponding to the task-related output layer network formed by the OOD detector network and the domain classification network of the semantic understanding model.

Step 1404: The apparatus for training a semantic understanding model performs parameter adjustment on the semantic representation layer network of the semantic understanding model.

In this way, a parameter of the semantic representation layer network is adapted to the loss function corresponding to the task-related output layer network.

The loss function of the encoder network is expressed as: loss_A=Σ(decoder_A(encoder(warp(x1)))−x1)2, where decoder_A denotes the decoder_A, warp denotes a function of a to-be-recognized sentence, $x_1$ denotes the to-be-recognized sentence, and encoder denotes the encoder.

In an iterative training process, the to-be-recognized sentence is substituted into the loss function of the encoder network, to solve parameters of the encoder A and the decoder_A when the loss function descends according to a gradient (for example, a maximum gradient). When the loss function converges (that is, when it is determined that a word-level hidden variable corresponding to the to-be-recognized sentence may be formed), the training ends.

In a process of training the encoder network, a loss function of the encoder network is expressed as: loss_B=Σ (decoder B(encoder(warp(x2)))−x2)2, where decoder B denotes the decoder B, warp denotes a function of a to-be-recognized sentence, x2 denotes the to-be-recognized sentence, and encoder denotes the encoder.

In an iterative training process, the to-be-recognized sentence is substituted into the loss function of the encoder network, to solve parameters of the encoder B and the decoder B when the loss function descends according to a gradient (for example, a maximum gradient). When the loss function converges (that is, when a selection probability of a translation result corresponding to the to-be-recognized sentence is obtained through decoding), the adjustment and the training end.

Figure 15:
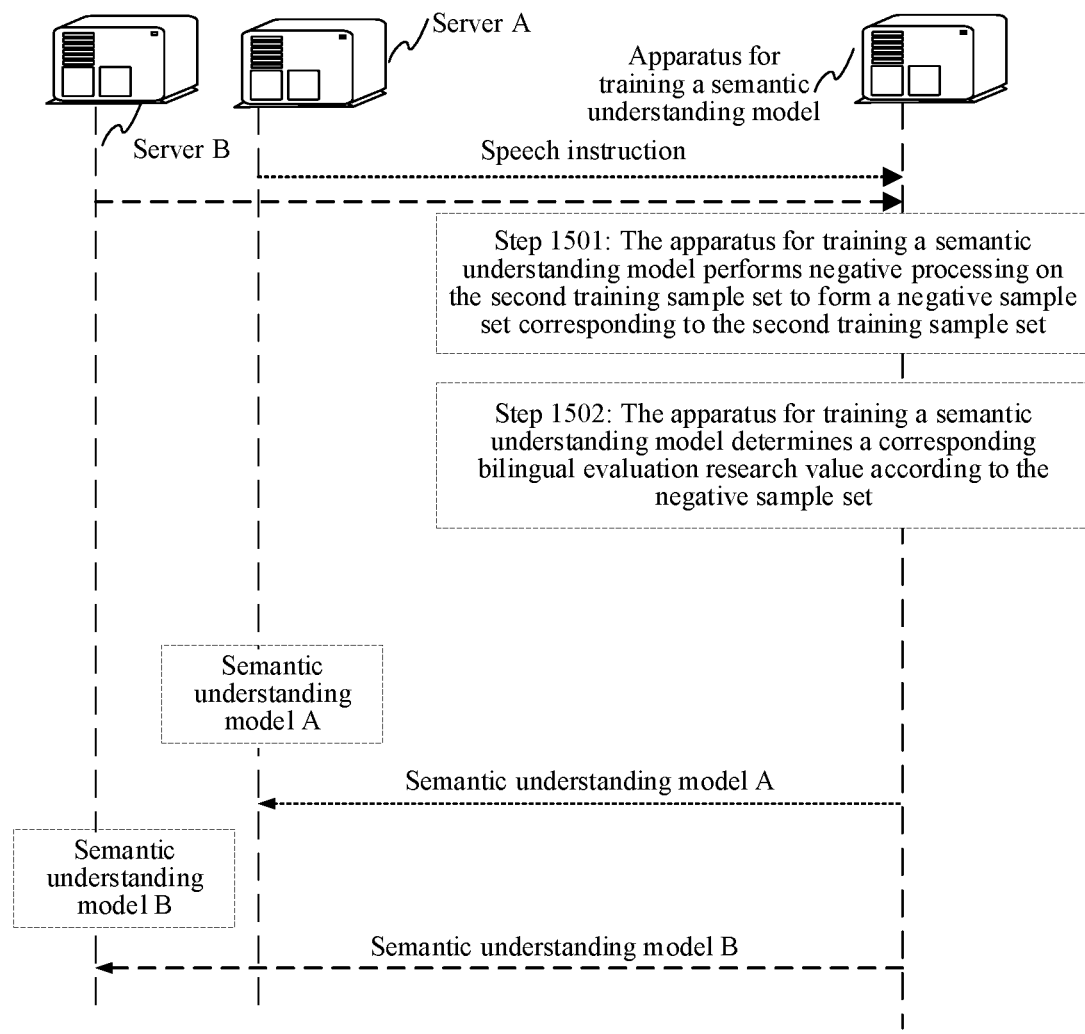
FIG. 15 is a schematic flowchart of a method for training a semantic understanding model according to an embodiment of this application.

FIG. 15 is a schematic flowchart of a method for training a semantic understanding model according to an embodiment of this application. It may be understood that the steps shown in FIG. 15 may be executed by various electronic devices running the apparatus for training a semantic understanding model, for example, may be a dedicated terminal with a semantic understanding model training function, a server with a semantic understanding model training function, or a server cluster. The following describes the steps shown in FIG. 15.

Step 1501: The apparatus for training a semantic understanding model performs negative processing on the second training sample set to form a negative sample set corresponding to the second training sample set.

The negative sample set is configured to adjust an OOD detector network parameter and a domain classification network parameter of the semantic understanding model.

In some embodiments of this application, the performing negative processing on the second training sample set may be implemented in the following manner:

randomly combining to-be-outputted sentences in a domain classification network of the semantic understanding model, to form the negative sample set corresponding to the second training sample set; or, randomly deleting or replacing to-be-outputted sentences in a domain classification network of the semantic understanding model, to form the negative sample set corresponding to the second training sample set.

Step 1502: The apparatus for training a semantic understanding model determines a corresponding bilingual evaluation research value according to the negative sample set. When a use scenario of full-duplex speech interaction applied by the semantic understanding model is non-Chinese use environment (may be a single English or another language use environment, or may be a use environment that includes at least two language sources), the corresponding bilingual evaluation research value determined according to the negative sample set may be configured as a supervision parameter to evaluate a semantic understanding result of the semantic understanding model.

In some embodiments of this application, an encoder and a decoder corresponding to the semantic representation layer network may be a two-way network model. For example, a Bi-GRU two-way GRU model may be selected as the corresponding encoder and decoder. The Bi-GRU two-way GRU model is a model that can recognize a structure of an inverted sentence. When the user enters a dialog sentence, the dialog sentence may be inverted, that is, different from a normal sentence structure. For example, the dialog sentence inputted by the user is "Today how is the weather", and the normal sentence structure is "How is the weather today", the Bi-GRU two-way GRU model can recognize dialog sentences with inverted sentence structures, thereby enriching functions of the trained model, and further improving the robustness of the finally trained target model.

Figure 16A:
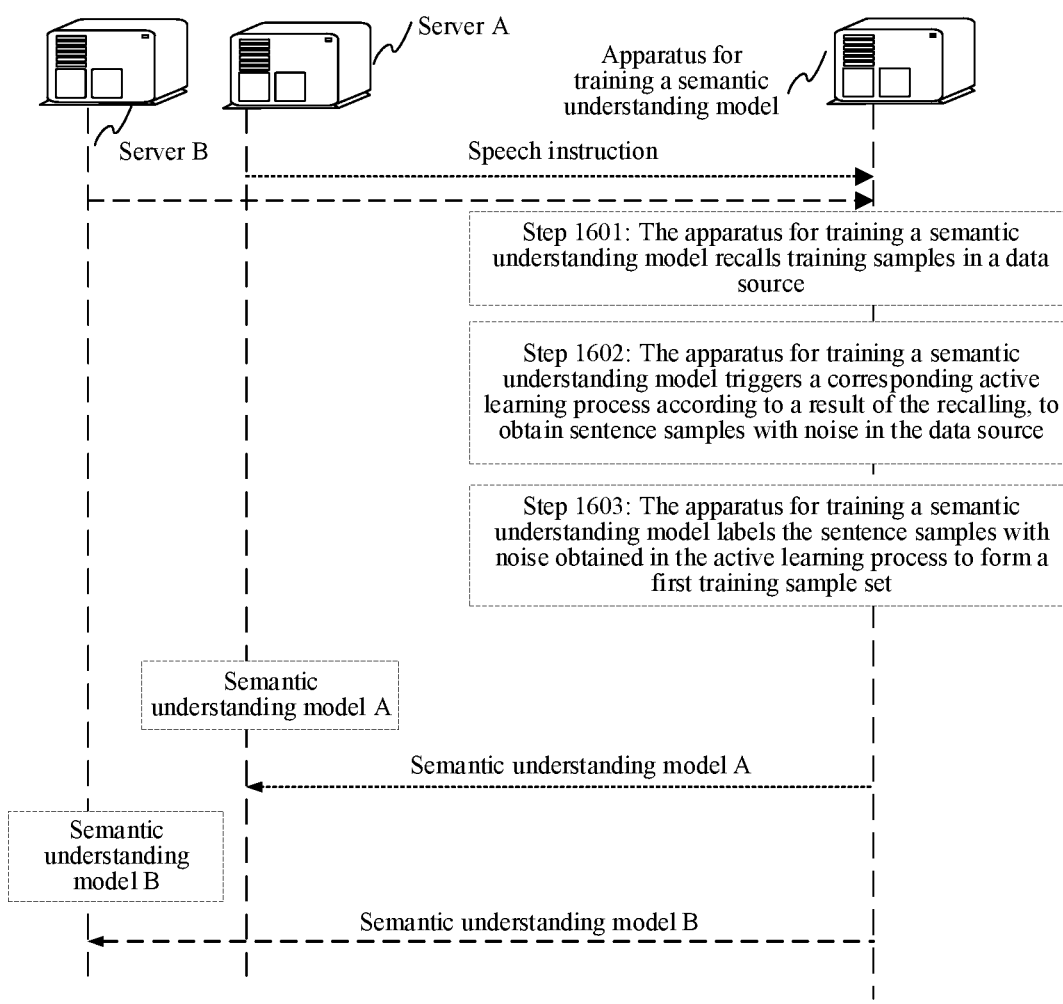
FIG. 16A is a schematic flowchart of a method for training a semantic understanding model according to an embodiment of this application.

FIG. 16A is a schematic flowchart of a method for training a semantic understanding model according to an embodiment of this application. It may be understood that the steps shown in FIG. 15 may be executed by various electronic devices running the apparatus for training a semantic understanding model, for example, may be a dedicated terminal with a semantic understanding model training function, a server with a semantic understanding model training function, or a server cluster. The following describes steps shown in FIG. 16A.

Step 1601: The apparatus for training a semantic understanding model recalls training samples in a data source.

The data source includes data of various types of application scenarios as the data source of the corresponding training samples. For example, the semantic understanding model provided in this application may be packaged as a software module in an in-vehicle electronic device, or may be packaged in different smart furniture (including, but not limited to, speakers, televisions, refrigerators, air conditioners, washing machines, and stoves), and certainly, may alternatively be solidified in a hardware device of a smart robot. For the different use scenarios of the semantic understanding model, corresponding training samples may be used to train the semantic understanding model in a targeted mode.

Step 1602: The apparatus for training a semantic understanding model triggers a corresponding active learning process according to a result of the recalling, to obtain sentence samples with noise in the data source.

Step 1603: The apparatus for training a semantic understanding model labels the sentence samples with noise obtained in the active learning process to form a first training sample set.

In some embodiments of this application, the labeling the sentence samples with noise obtained in the active learning process to form a first training sample set may be implemented in the following manner:

determining sample types of the sentence samples with noise; sorting negative samples in the sample types of the sentence samples; and configuring corresponding weights for the negative samples according to a sorting result of the negative samples, to form the first training sample set including training samples with different weights.

In some embodiments of this application, the apparatus for training a semantic understanding model may trigger an active exploration process in response to the active learning process, to perform boundary corpus expansion processing on the sentence samples with noise matching the in-vehicle environment.

Figure 16B:
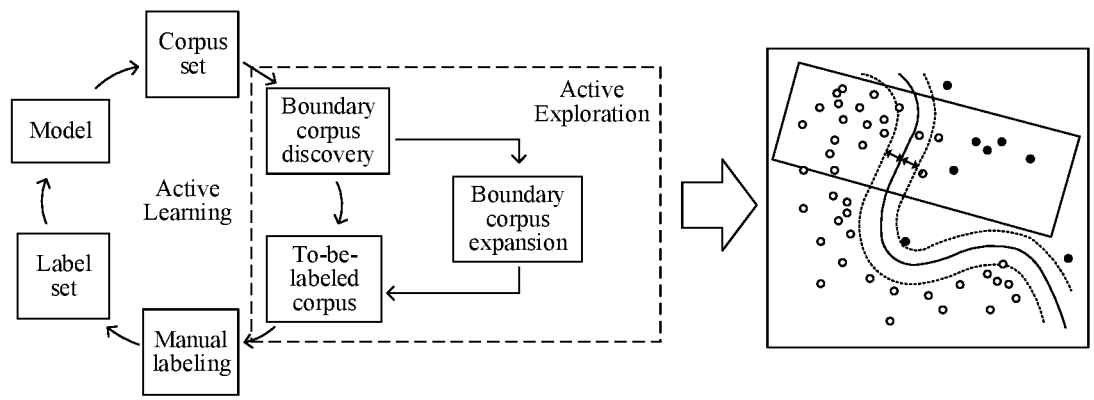
FIG. 16B is a schematic diagram of boundary corpus expansion of a method for training a semantic understanding model according to an embodiment of this application.

The apparatus for training a semantic understanding model may trigger a text similarity clustering network in the active exploration process in response to the active learning process, to determine a text clustering center of the sentence samples with noise matching the in-vehicle environment; search the data source according to the text clustering center of the sentence samples with noise matching the in-vehicle environment, to perform text augmentation on the sentence samples with noise matching the in-vehicle environment; trigger a corresponding manifold learning process according to a result of the text augmentation on the sentence samples with noise matching the in-vehicle environment, to perform dimensionality reduction processing on the result of the text augmentation, so as to perform boundary corpus expansion on the sentence samples with noise matching the in-vehicle environment. FIG. 16B is a schematic diagram of boundary corpus expansion of a method for training a semantic understanding model according to an embodiment of this application. The text clustering center of the sentence samples with noise matching the in-vehicle environment is determined by using the text similarity clustering network in the active exploration process, and the data source is searched based on the text clustering center, to obtain sentence samples associated with the sentence samples with noise matching the in-vehicle environment, which can effectively increase the quantity of sentence samples with noise matching the in-vehicle environment. However, the dimension of the training samples increases during the augmentation of the training sample sentences. Therefore, dimensionality reduction processing is performed on the result of the text augmentation through the manifold learning process, which can reduce the impact of data dimension on the accuracy of the semantic understanding model training in the subsequent model training process, and reduce the training difficulty and the waiting time of the user.

Figure 17:
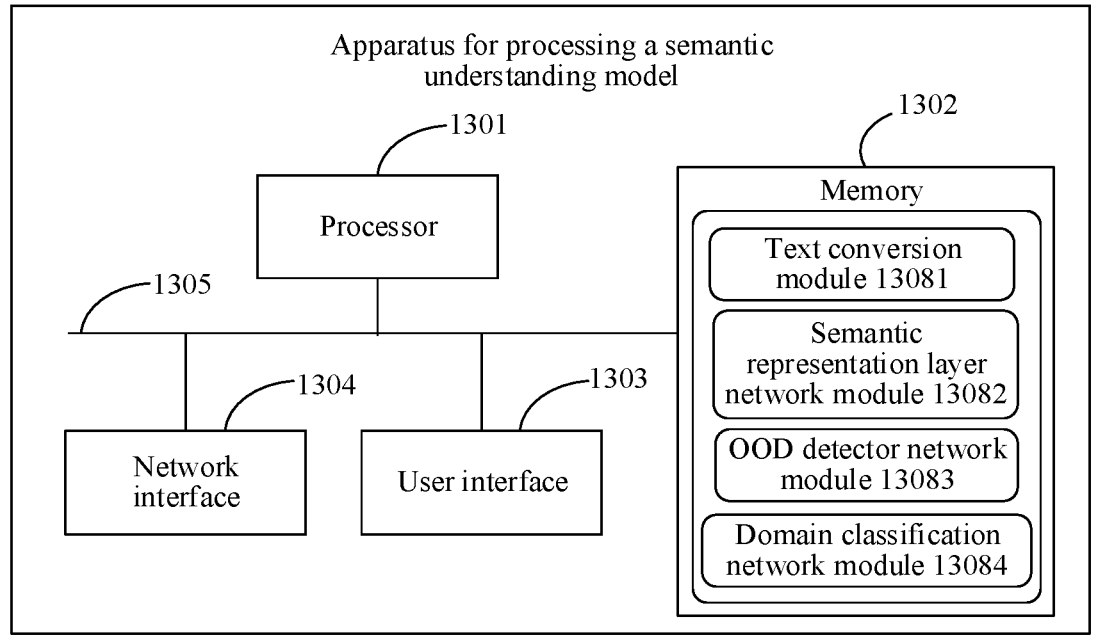
FIG. 17 is a schematic diagram of a composition structure of an apparatus for processing a semantic understanding model according to an embodiment of this application.

The following describes a structure of an apparatus for processing a semantic understanding model according to the embodiments of this application in detail. The apparatus for processing a semantic understanding model may be implemented in various forms, for example, a dedicated terminal capable of running a semantic understanding model, or a server with an answering function (for example, the foregoing server 200 in FIG. 1) to generate a corresponding translation result according to a to-be-translated sentence received by an application in the terminal. FIG. 17 is a schematic diagram of a composition structure of an apparatus for processing a semantic understanding model according to an embodiment of this application. It may be understood that FIG. 17 only shows the exemplary structure of the apparatus for processing a semantic understanding model rather than the entire structure. A part of the structure or the entire structure shown in FIG. 17 may be implemented as required.

The apparatus for processing a semantic understanding model provided in this embodiment of this application includes: at least one processor 1301, a memory 1302, a user interface 1303, and at least one network interface 1304. Various components in the apparatus 130 for processing a semantic understanding model are coupled together through a bus system 1305. It may be understood that the bus system 1305 is configured to implement connection and communication between these assemblies. In addition to a data bus, the bus system 1305 further includes a power bus, a control bus, and a state signal bus. However, for ease of clear description, all types of buses are labeled as the bus system 1305 in FIG. 17.

The user interface 1303 may include a display, a keyboard, a mouse, a track ball, a click wheel, a key, a button, a touch panel, a touchscreen, or the like.

It may be understood that, the memory 1302 may be a volatile memory or a non-volatile memory, or may include both a volatile memory and a non-volatile memory. The memory 1302 in this embodiment of this application can store data to support operation of the terminal (for example, 10-1). Examples of these types of data include any computer program to be operated on the terminal (for example, 10-1), for example, an operating system and an application program. The operating system includes various system programs, such as a framework layer, a kernel library layer, and a driver layer, which are configured to implement various basic services and process a task based on hardware. The application program may include various application programs.

In some embodiments, the apparatus for processing a semantic understanding model provided in the embodiments of this application may be implemented by a combination of software and hardware. For example, the apparatus for processing a semantic understanding model provided in the embodiments of this application may be a processor in the form of a hardware decoding processor, and is programmed to perform the semantic processing method for a semantic understanding model provided in the embodiments of this application. For example, the processor in the form of a hardware decoding processor may use one or more ASICs, digital signal processor (DSP), programmable logic devices (PLDs), complex programmable logic device (CPLD), FPGAs, or other electronic elements.

For example, the apparatus for processing a semantic understanding model provided in the embodiments of this application is implemented by a combination of software and hardware. The apparatus for processing a semantic understanding model provided in the embodiments of this application may be directly embodied as a combination of software modules executed by the processor 1301. The software module may be located in a storage medium, the storage medium is located in the memory 1302, and the processor 1301 reads executable instructions included in the software module in the memory 1302. The semantic processing method for a semantic understanding model provided in the embodiments of this application is completed in combination with necessary hardware (for example, includes a processor 1301 and another assembly connected to the bus 1305).

For example, the processor 1301 may be an integrated circuit chip, and has a signal processing capability, for example, a general-purpose processor, a digital signal processor (DSP), or another programmable logical device, a discrete gate or a transistor logical device, or a discrete hardware component. The general-purpose processor may be a microprocessor, any conventional processor, or the like.

In an example in which the apparatus for processing a semantic understanding model provided in the embodiments of this application is implemented by hardware, the apparatus provided in the embodiments of this application may be directly executed by using the processor 1301 in the form of a hardware decoding processor, for example, one or more ASICs, DSPs, PLDs, CPLDs, FPGAs, or other electronic elements, to execute the semantic processing method for a semantic understanding model provided in the embodiments of this application.

The memory 1302 in this embodiment of this application is configured to store various types of data to support operation of the apparatus 130 for processing a semantic understanding model. Examples of these types of data include any executable instruction to be operated on the apparatus 130 for processing a semantic understanding model, for example, an executable instruction. A program for implementing the semantic processing method for a semantic understanding model of the embodiments of this application may be included in the executable instruction.

In some other embodiments, the apparatus for processing a semantic understanding model provided in the embodiments of this application may be implemented by software. FIG. 17 shows the apparatus for processing a semantic understanding model stored in the memory 1302, which may be software in the form of a program and a plug-in and includes a series of modules. An example of a program stored in the memory 1302 may include an apparatus for processing a semantic understanding model. The apparatus for processing a semantic understanding model includes the following software modules: a text conversion module 13081, a semantic representation layer network module 13082, an OOD detector network module 13083, a domain classification network module 13084, and an information processing module 13085. When the software modules in the apparatus for processing a semantic understanding model are read by the processor 1301 into a RAM for execution, the semantic processing method for a semantic understanding model provided in the embodiments of this application is implemented. Functions of the software modules in the apparatus for processing a semantic understanding model include:

a text conversion module 13081, configured to obtain speech instruction information, and convert the speech instruction information into corresponding recognizable text information;

a semantic representation layer network module 13082, configured to determine at least one word-level hidden variable corresponding to the recognizable text information by using a semantic representation layer network of a semantic understanding model;

an OOD detector network module 13083, configured to determine an object matching the word-level hidden variable according to the at least one word-level hidden variable and by using an OOD detector network of the semantic understanding model;

a domain classification network module 13084, configured to determine a task domain corresponding to the word-level hidden variable according to the at least one word-level hidden variable and by using a domain classification network of the semantic understanding model; and an information processing module 13085, configured to trigger a corresponding service process according to the object matching the word-level hidden variable and the task domain corresponding to the word-level hidden variable, to complete a task corresponding to the speech instruction information.

Figure 18:
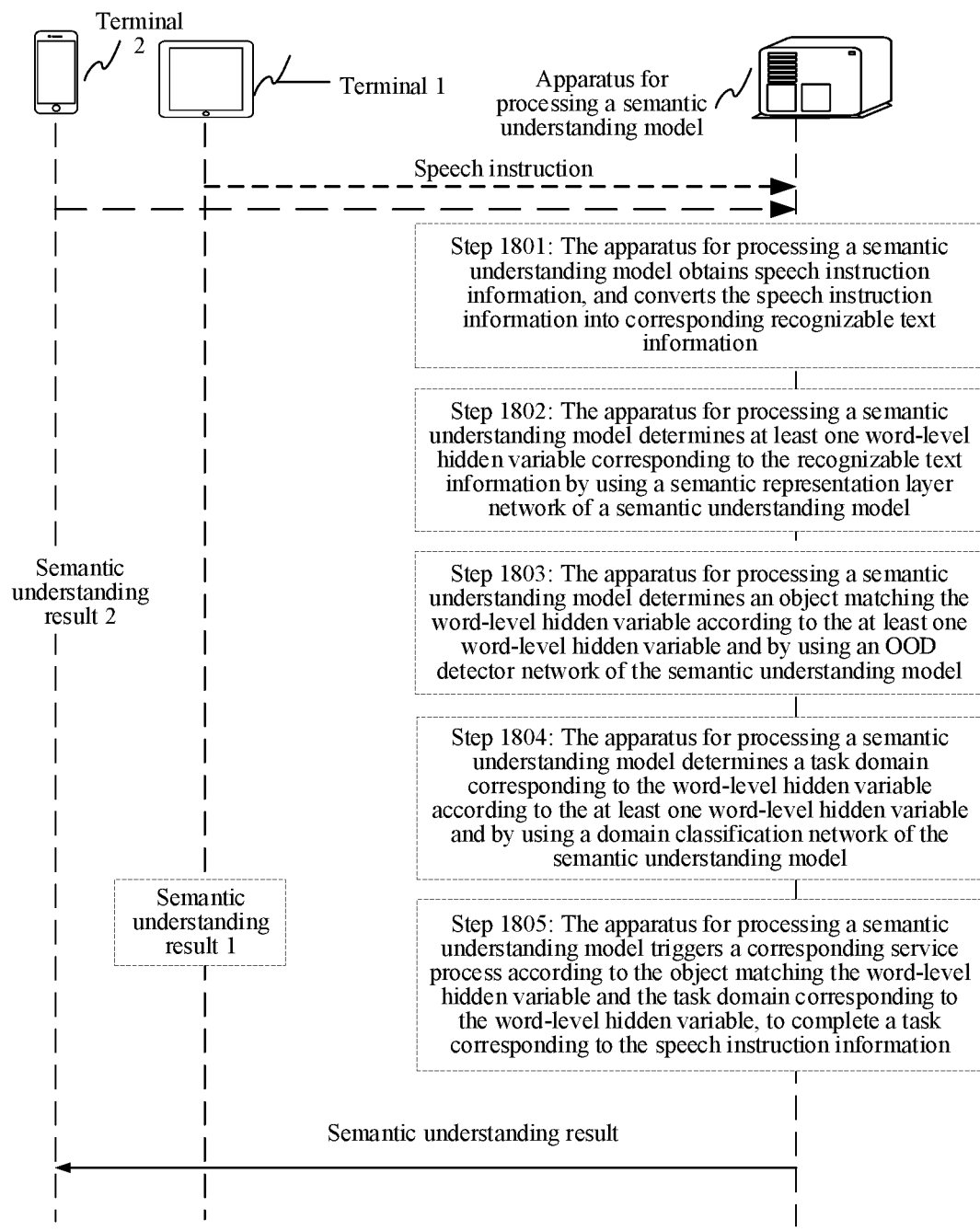
FIG. 18 is a schematic flowchart of a semantic processing method for a semantic understanding model according to an embodiment of this application.

The semantic processing method for a semantic understanding model provided in the embodiments of this application is described with reference to the apparatus 130 for processing a semantic understanding model shown in FIG. 17. FIG. 18 is a schematic flowchart of a semantic processing method for a semantic understanding model according to an embodiment of this application. It may be understood that, steps shown in FIG. 18 may be performed by various electronic devices running the apparatus for processing a semantic understanding model, such as a dedicated terminal with a to-be-translated sentence processing function, a server with the to-be-translated sentence processing function, or a server cluster. The following describes the steps shown in FIG. 18.

Step 1801: The apparatus for processing a semantic understanding model obtains speech instruction information, and converts the speech instruction information into corresponding recognizable text information;

Step 1802: The apparatus for processing a semantic understanding model determines at least one word-level hidden variable corresponding to the recognizable text information by using a semantic representation layer network of a semantic understanding model;

Step 1803: The apparatus for processing a semantic understanding model determines an object matching the word-level hidden variable according to the at least one word-level hidden variable and by using an OOD detector network of the semantic understanding model;

Step 1804: The apparatus for processing a semantic understanding model determines a task domain corresponding to the word-level hidden variable according to the at least one word-level hidden variable and by using a domain classification network of the semantic understanding model; and Step 1805: The apparatus for processing a semantic understanding model triggers a corresponding service process according to the object matching the word-level hidden variable and the task domain corresponding to the word-level hidden variable, to complete a task corresponding to the speech instruction information.

In this way, a task corresponding to the speech instruction information is completed.

Figure 19:
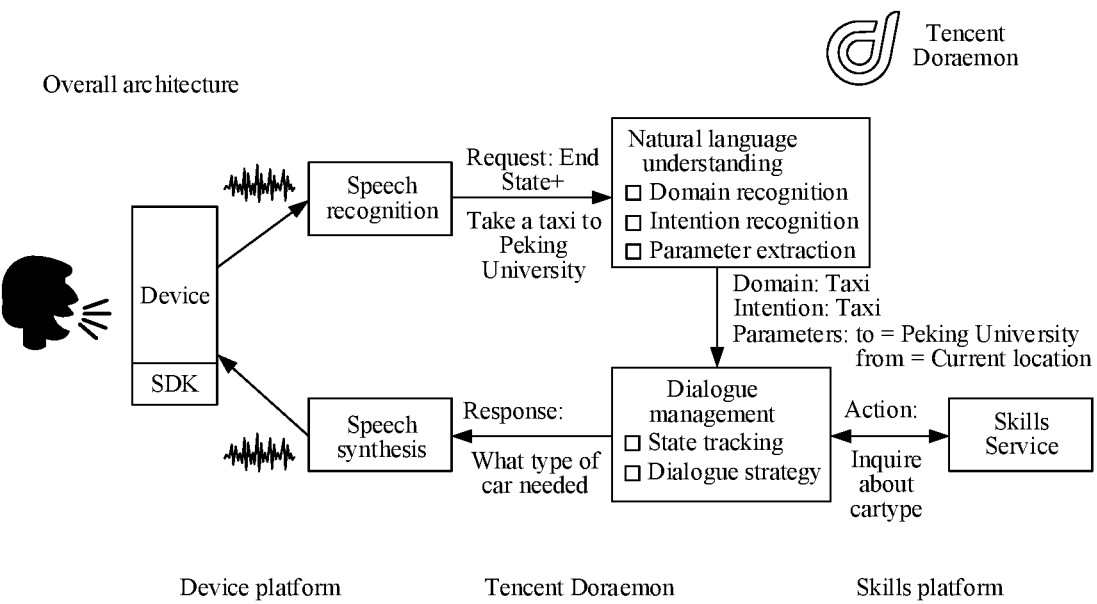
FIG. 19 is a schematic diagram of a use scenario of a method for training a semantic understanding model according to an embodiment of this application.
Figure 20:
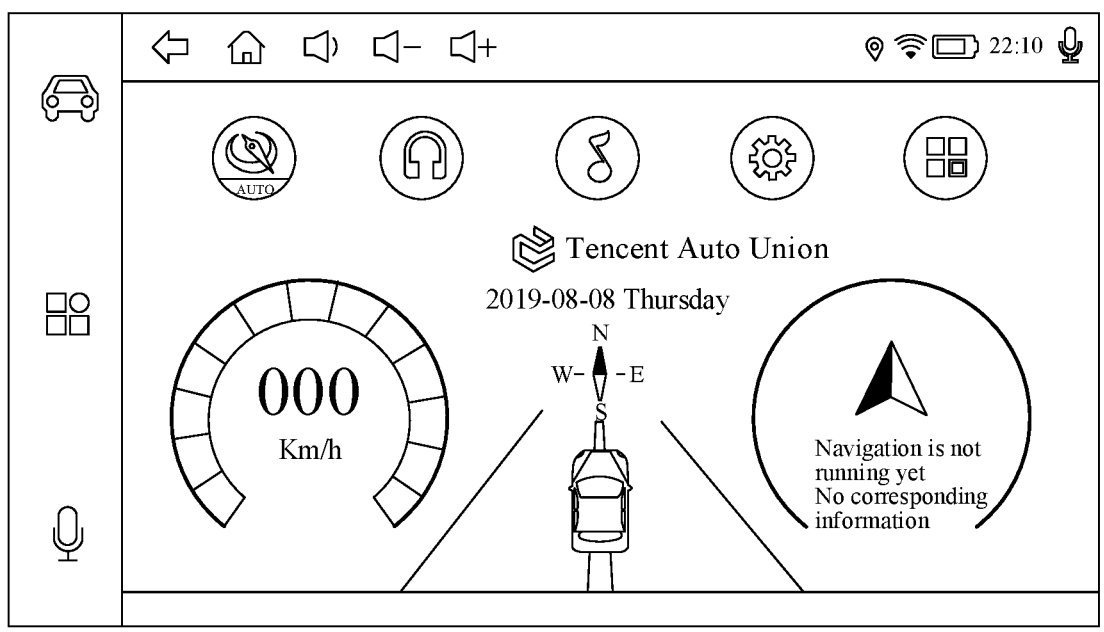
FIG. 20 is a schematic diagram of a use scenario of a method for training a semantic understanding model according to an embodiment of this application.

The following uses an in-vehicle semantic understanding model as an example to describe a use environment of the method for training a semantic understanding model provided in this application. Referring to FIG. 19 and FIG. 20, FIG. 19 is a schematic diagram of a use scenario of a method for training a semantic understanding model according to an embodiment of this application. The method for training a semantic understanding model provided in this application may serve as a form of cloud service for various types of customers (packaged in an in-vehicle terminal or packaged in a different mobile electronic device). FIG. 20 is a schematic diagram of a use scenario of a method for training a semantic understanding model according to an embodiment of this application. The specific use scenario is not specifically limited in this application. The method for training a semantic understanding model is provided to enterprise customers as a cloud service to help the enterprise customers train a semantic understanding model according to different device use environments.

Figure 21:
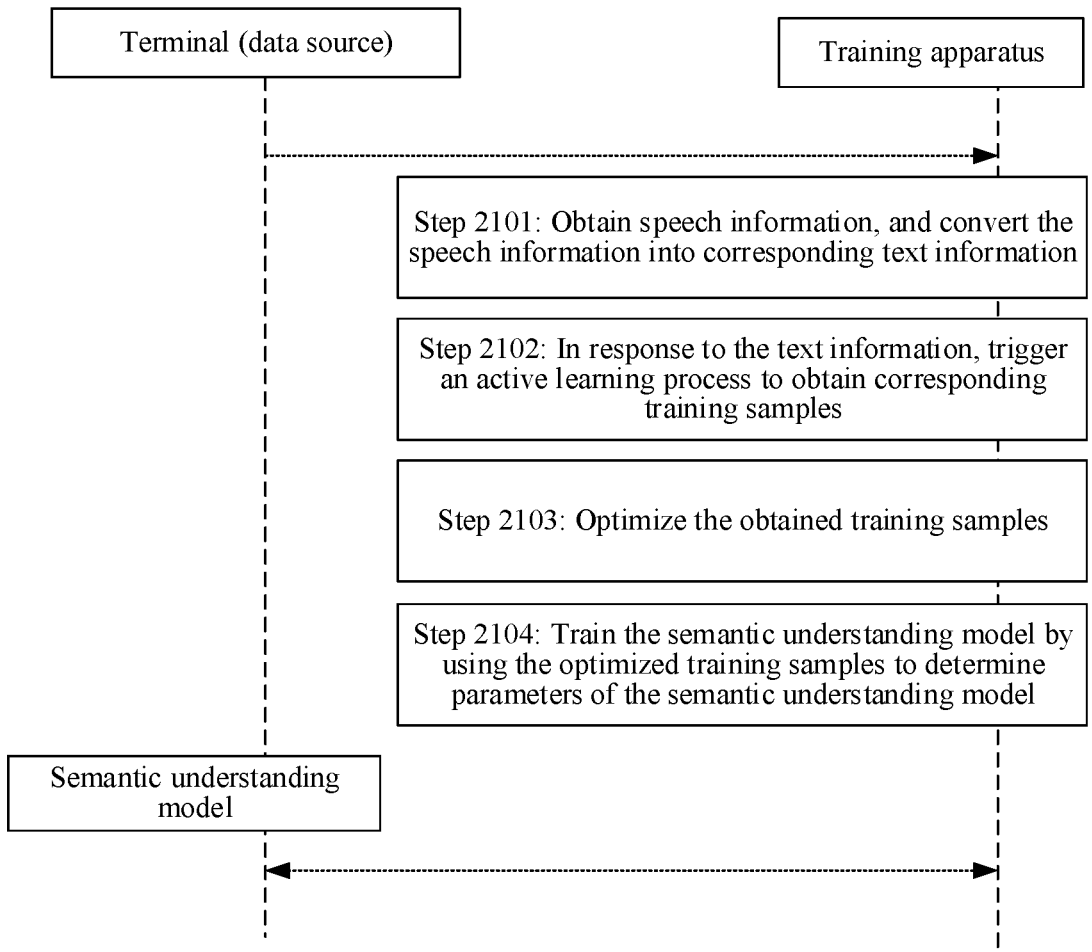
FIG. 21 is a schematic flowchart of a method for training a semantic understanding model according to this application.

FIG. 21 is a schematic flowchart of a method for training a semantic understanding model according to this application. The method includes the following steps:

Step 2101: Obtain speech information, and convert the speech information into corresponding text information.

Referring to a natural language understanding module in FIG. 19, a speech signal of the user is converted into a text signal by using a semantic understanding module. Structured information such as a domain and intention of the user, and parameters is extracted from the text by using the natural language understanding module. Such semantic elements are passed to a dialog management module for inquiry processing, or strategies such as state management. Finally, an output of the system is broadcast to the user through speech synthesis.

Step 2102: In response to the text information, trigger an active learning process to obtain corresponding training samples.

Figure 22:
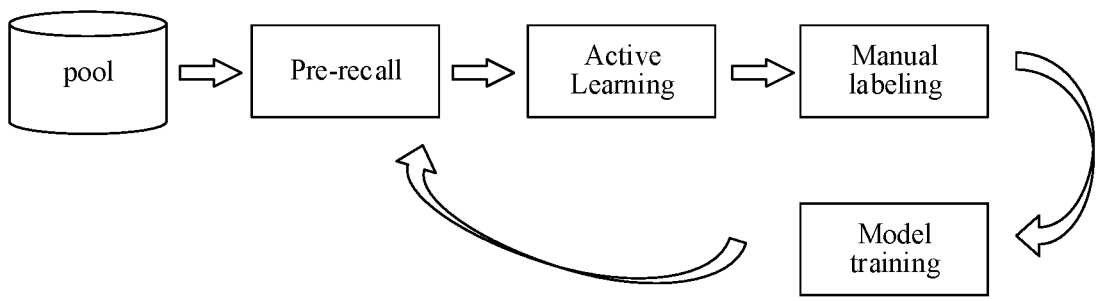
FIG. 22 is a schematic diagram of an active learning process during processing of a method for training a semantic understanding model according to an embodiment of this application.

FIG. 22 is a schematic diagram of an active learning process during processing of a method for training a semantic understanding model according to an embodiment of this application. Both a negative corpus model (OOD model) and a domain classifier model both need to mine a large quantity of negative samples, but the cost of manual labeling is limited. Therefore, it is necessary to mine the most valuable samples with the largest amount of information and the greatest gain to the model from massive data with limited labeling manpower. Therefore, a data mining process shown in FIG. 22 may be constructed based on the idea of active learning. In this way, the entire data closed-loop mining process based on active learning includes data generation, selection, labeling, and model training. It is guaranteed that generated samples are the most urgently needed and helpful samples for the semantic understanding model, and the labeling labor cost is effectively reduced by screening the samples.

Step 2103: Optimize the obtained training samples.

Through step 2102, a large quantity of OOD corpus, domain negative sample corpus, and domain positive sample corpus are mined and accumulated. During training of the semantic understanding model, a One V.S All method is used to organize positive and negative samples. This method determines that a ratio of positive and negative samples of a domain classifier is imbalanced. In some scenarios, the ratio of positive and negative samples reaches 1:100, and in some extreme cases, reaches 1:2000. During actual use of the semantic understanding model, even if negative samples in some fields are sufficient, an FAR index of a trained model is still relatively high. Therefore, a negative sample distribution optimization strategy is provided through analysis of bad cases and experiments. In some embodiments of this application, the strategy includes: grouping negative samples according to importance (public negative samples, domain negative samples, positive samples in other related fields, and positive samples in other unrelated fields), assigning a different weight for each group of samples, assigning higher weights for domain negative samples and positive samples related to other domains, and assigning lower weights for other negative samples.

In this way, the negative samples are grouped and weights thereof are finely adjusted, which can effectively reduce a misrecognition rate of the model.

Step 2104: Train the semantic understanding model by using the optimized training samples to determine parameters of the semantic understanding model.

In this way, the trained semantic understanding model may be used to recognize and process speech instructions in a noisy environment.

Figure 23:
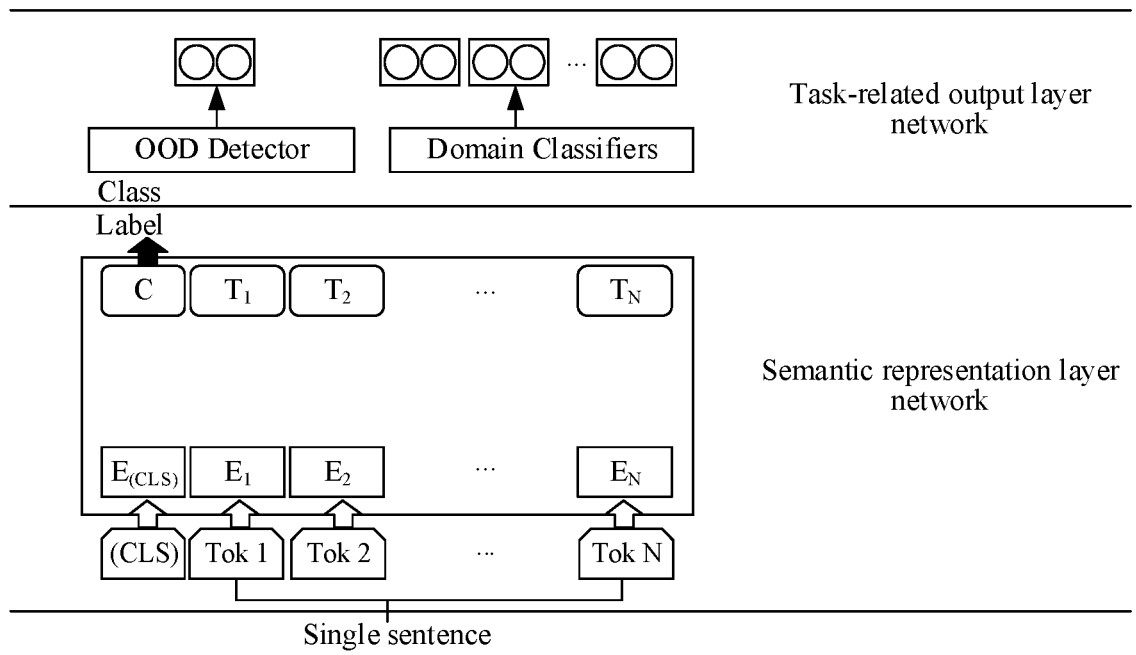
FIG. 23 is a schematic diagram of a model structure of a semantic understanding model according to an embodiment of this application.

FIG. 23 is a schematic diagram of a model structure of a semantic understanding model according to an embodiment of this application. On the model network side, a multi-task learning training method may be used to jointly train the OOD model and the domain classification model. An optional network structure is shown in FIG. 23. The entire network structure is divided into two layers:

1) A pre-training model based on BERT is used as a semantic representation layer.

2) An output layer related to downstream tasks, where the two layers may be represented by a fully connected network.

The method for training a semantic understanding model provided in this application may jointly train the OOD detector model and the domain classification model. The OOD model is a binary classification task used to determine whether a corpus is IND or OOD. The domain classifier model is formed by a plurality of binary classifiers, and may use a data organization method of One V.S All. The domain classifier is used to determine which field of the IND (weather, navigation, music, or the like) the corpus is. Further, because OOD and domain classifiers are two very related tasks, if the corpus is OOD, the corpus is definitely a negative sample of binary classifiers in all domains; and if the corpus is IND, the corpus is definitely one of the domain classifiers or a positive sample in a plurality of fields. The correlation between tasks may be used to construct a joint loss function:

$$L(\cdot)=L_{-D}(\cdot)+a\, L_{-O}(\cdot)$$

where $L_{-D}(\cdot)$ is a loss generated by the domain classifier, $L_{-O}(\cdot)$ is a loss generated by the OOD detector, a is a hyperparameter that controls the impact of OOD on the loss of the entire model, a may be set to 1 during actual training, and a loss of the output layer may use cross entropy:

$$L_{-D}(\cdot)=-p'\log p$$

p is a soft-max prediction probability of the sample, and p^' is a ground-truth label of the sample. Parameters of the semantic representation layer BERT are fine-tuned during the training, and output layer parameters of OOD and each domain classifier are independently optimized.

Figure 24:
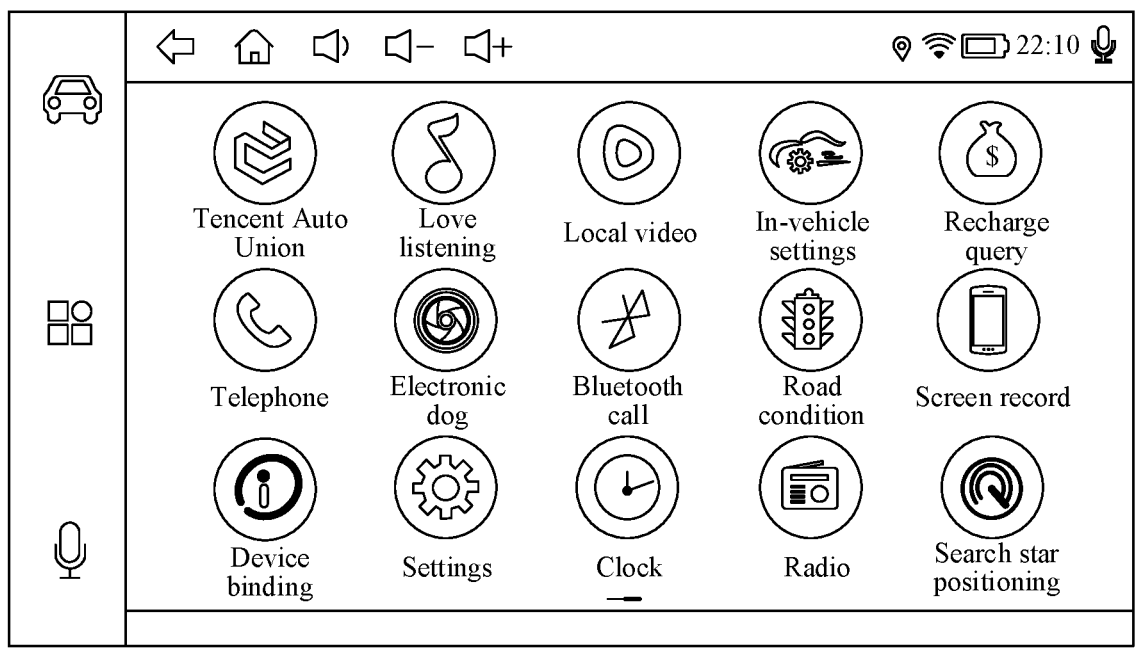
FIG. 24 is a schematic diagram of waking up an application by using a semantic understanding model packaged in an in-vehicle system.
Figure 25:
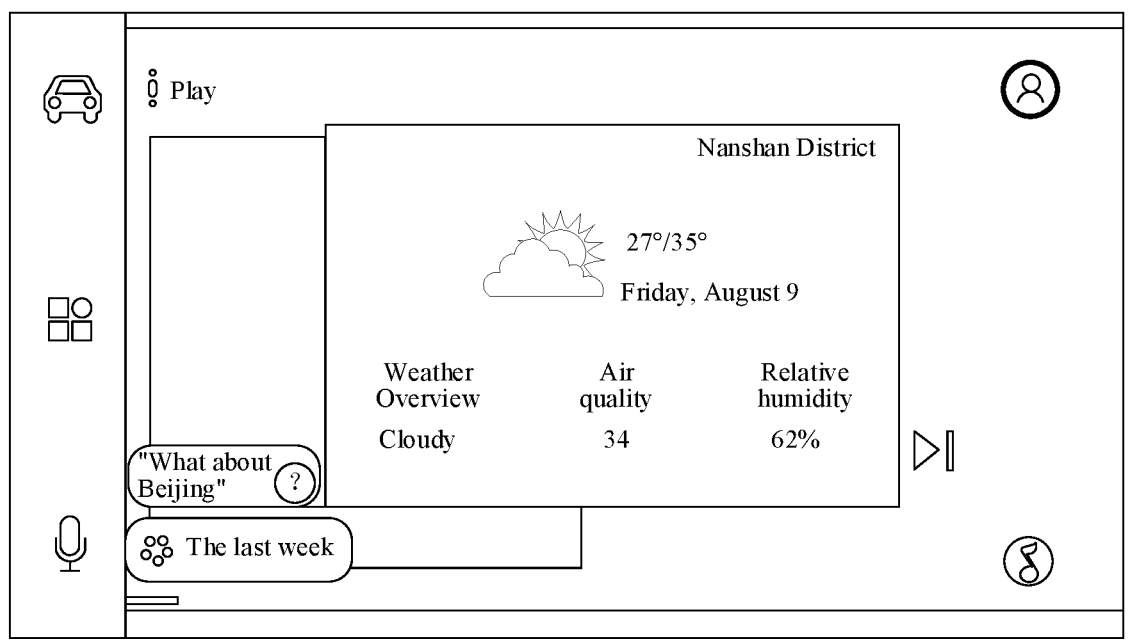
FIG. 25 is a schematic diagram of checking the weather by using a semantic understanding model packaged in an in-vehicle system.

As a result, in a full-duplex dialog scenario, a dialog object of the user transfers, and the user talks, chats with friends around, and talks to himself/herself from time to time. By using the method for training a semantic understanding model provided in this application, the misrecognition rate of the dialog can be effectively reduced, thereby ensuring that the assistant does not respond incorrectly during the dialog. Further, through active learning, a large quantity of negative samples are mined for model training. After several cycles of iteration, the initially high misrecognition rate of the semantic understanding model is reduced to a proper range. Meanwhile, the negative samples are grouped and different weights are assigned to different groups to adjust the internal sample distribution, so that the misrecognition rate is further reduced. It indicates that the semantic understanding model can learn important information from negative samples with larger weights by adjusting the distribution of the negative samples, while the amount of information of negative samples with lower weights has become saturated. Finally, on the model structure side, an OOD rejection model is introduced for joint learning, so that the misrecognition rate of an internal development set and a test set can be reduced to varying degrees. Therefore, according to this application, the misrecognition rate of the intelligent assistant in the full-duplex scenario is optimized, to ensure that the intelligent assistant can effectively responds to correct dialog appeals of the user and reject non-dialog appeals, thereby ensuring the feasibility and smoothness of the interaction, and effectively improving the user experience. FIG. 24 is a schematic diagram of waking up an application by using a semantic understanding model packaged in an in-vehicle system. FIG. 25 is a schematic diagram of checking the weather by using a semantic understanding model packaged in an in-vehicle system. Certainly, in some embodiments of this application, a post-processed rank model may be further connected to task specific layers. Inputs of the model are predicted scores of OOD and various domain classifiers, and an output is a prediction result of the entire model. In this application, only an OOD prediction result and a domain classifier prediction result are processed in a level of logic, that is, when the OOD model predicts out of domain, a result is directly returned and no domain classifier prediction is performed. However, the OOD model may make prediction errors. The domain classifier model has a confidence in prediction, but a final result is IND. An alternative solution can give a proper prediction result based on comprehensive comparison by learning this combination relationship, to reduce the error rate of semantic understanding results of the semantic understanding model.

This application has the following beneficial effects:

According to the method, a first training sample set is obtained, the first training sample set including sentence samples with noise obtained through an active learning process; denoising processing is performed on the first training sample set to form a corresponding second training sample set; the second training sample set is processed by using a semantic understanding model, to determine initial parameters of the semantic understanding model; the second training sample set is processed by using the semantic understanding model in response to the initial parameters of the semantic understanding model, to determine update parameters of the semantic understanding model; and a semantic representation layer network parameter and a task-related output layer network parameter of the semantic understanding model are iteratively updated by using the second training sample set and according to the update parameters of the semantic understanding model. Therefore, the generalization ability of the semantic understanding model is enhanced and the training accuracy and training speed of the semantic understanding model are improved. In addition, the gain of the existing noise sentences in model training can be effectively and fully utilized, so that the semantic understanding model can adapt to different use scenarios, and the impact of environmental noise on the semantic understanding model can be reduced.

The foregoing descriptions are merely embodiments of this application, but are not used to limit this application. Any modification, equivalent replacement and improvement made within the spirit and principle of this application shall fall within the protection scope of this application.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

INDUSTRIAL APPLICABILITY

In the embodiments of this application, a first training sample set is obtained, the first training sample set including sentence samples with noise obtained through an active learning process; denoising processing is performed on the first training sample set to form a corresponding second training sample set; the second training sample set is processed by using a semantic understanding model, to determine initial parameters of the semantic understanding model; the second training sample set is processed by using the semantic understanding model in response to the initial parameters of the semantic understanding model, to determine update parameters of the semantic understanding model; and a semantic representation layer network parameter and a task-related output layer network parameter of the semantic understanding model are iteratively updated by using the second training sample set and according to the update parameters of the semantic understanding model. Therefore, the generalization ability of the semantic understanding model is enhanced and the training accuracy and training speed of the semantic understanding model are improved. In addition, the gain of the existing noise sentences in model training can be effectively and fully utilized, so that the semantic understanding model can adapt to different use scenarios, the impact of environmental noise on the semantic understanding model can be reduced, and invalid triggers of an electronic device can be reduced, which is conducive to the deployment of the semantic understanding model in a mobile terminal.

What is claimed is:

1. A method for training a semantic understanding model performed by an electronic device, the method comprising:
obtaining a first training sample set, the first training sample set comprising sentence samples with noise obtained through an active learning process, wherein the active learning process includes identifying negative samples in the first training sample set and assigning different weights to the negative samples, and the weight of a negative sample indicates the amount of information of the negative sample;
performing denoising processing on the first training sample set to form a corresponding second training sample set;
processing the second training sample set by using a semantic understanding model, to determine initial parameters of the semantic understanding model;
processing the second training sample set by using the semantic understanding model in response to the initial parameters of the semantic understanding model, to determine update parameters of the semantic understanding model; and
iteratively updating a semantic representation layer network parameter and a task-related output layer network parameter of the semantic understanding model by using the second training sample set and according to the update parameters of the semantic understanding model.

2. The method according to claim 1, wherein the performing denoising processing on the first training sample set to form a corresponding second training sample set comprises:
determining a dynamic noise threshold matching a use environment of the semantic understanding model; and
performing denoising processing on the first training sample set according to the dynamic noise threshold, to form the second training sample set matching the dynamic noise threshold.

3. The method according to claim 1, wherein the performing denoising processing on the first training sample set to form a corresponding second training sample set comprises:
determining a fixed noise threshold corresponding to the semantic understanding model; and
performing denoising processing on the first training sample set according to the fixed noise threshold, to form the second training sample set matching the fixed noise threshold.

4. The method according to claim 1, wherein the processing the second training sample set by using the semantic understanding model in response to the initial parameters of the semantic understanding model, to determine update parameters of the semantic understanding model comprises:
substituting different sentence samples in the second training sample set into a loss function corresponding to a task-related output layer network formed by an out-of-domain (OOD) detector network and a domain classification network of the semantic understanding model; and
determining a corresponding OOD detector network parameter and a corresponding domain classification network parameter in the semantic understanding model as the update parameters of the semantic understanding model when the loss function meets a corresponding convergence condition.

5. The method according to claim 4, wherein the iteratively updating a semantic representation layer network parameter and a task-related output layer network parameter of the semantic understanding model by using the second training sample set and according to the update parameters of the semantic understanding model comprises:
determining a second noise parameter matching the second training sample set by using the update parameters of the semantic understanding model, the second noise parameter being configured to represent a noise value of a parallel sentence sample in the second training sample set; and
when the second noise parameter reaches a corresponding noise value threshold,
iteratively updating the semantic representation layer network parameter and the task-related output layer network parameter of the semantic understanding model according to the noise value of the second noise parameter, until the loss function corresponding to the task-related output layer network formed by the OOD detector network and the domain classification network of the semantic understanding model meet the corresponding convergence condition.

6. The method according to claim 4, further comprising:
in response to the loss function corresponding to the task-related output layer network formed by the OOD detector network and the domain classification network of the semantic understanding model,
performing parameter adjustment on the semantic representation layer network of the semantic understanding model, so that a parameter of the semantic representation layer network is adapted to the loss function corresponding to the task-related output layer network.

7. The method according to claim 1, further comprising:
performing negative processing on the second training sample set to form a negative sample set corresponding to the second training sample set, the negative sample set being configured to adjust an OOD detector network parameter and a domain classification network parameter of the semantic understanding model; and
determining a corresponding bilingual evaluation research value according to the negative sample set, the bilingual evaluation research value being configured as a supervision parameter to evaluate a semantic understanding result of the semantic understanding model.

8. The method according to claim 7, wherein the performing negative processing on the second training sample set comprises:
randomly combining to-be-outputted sentences in a domain classification network of the semantic understanding model, to form the negative sample set corresponding to the second training sample set; on
randomly deleting or replacing to-be-outputted sentences in a domain classification network of the semantic understanding model, to form the negative sample set corresponding to the second training sample set.

9. The method according to claim 1, further comprising:
recalling training samples in a data source;
triggering a corresponding active learning process according to a result of the recalling, to obtain sentence samples with noise in the data source; and
labeling the sentence samples with noise obtained in the active learning process to form the first training sample set.

10. The method according to claim 9, wherein the labeling the sentence samples with noise obtained in the active learning process to form the first training sample set comprises:
determining sample types of the sentence samples with noise;
sorting the negative samples in the sample types of the sentence samples according to their respective amount of information; and
configuring corresponding weights for the negative samples according to a sorting result of the negative samples, to form the first training sample set comprising training samples with different weights.

11. The method according to claim 1, further comprising:
obtaining speech instruction information, and converting the speech instruction information into corresponding recognizable text information;
determining at least one word-level hidden variable corresponding to the recognizable text information by using the semantic understanding model;
determining an object matching the word-level hidden variable according to the at least one word-level hidden variable and by using an out-of-domain (OOD) detector network of the semantic understanding model;
determining a task domain corresponding to the word-level hidden variable according to the at least one word-level hidden variable and by using a domain classification network of the semantic understanding model; and triggering a corresponding service process according to the object matching the word-level hidden variable and the task domain corresponding to the word-level hidden variable, to complete a task corresponding to the speech instruction information.

12. The method according to claim 11, further comprising:
recalling training samples corresponding to the semantic understanding model matching an in-vehicle environment in a data source;
triggering a corresponding active learning process according to a result of the recalling, to obtain sentence samples with noise corresponding to the semantic understanding model matching the in-vehicle environment in the data source; and
labeling the sentence samples with noise obtained in the active learning process to form a first training sample set, the first training sample set comprising at least one labeled sentence sample with noise corresponding to the semantic understanding model matching the in-vehicle environment.

13. An electronic device, comprising:
a memory, configured to store executable instructions; and
a processor, configured to perform, when executing the executable instructions stored in the memory, a plurality of operations including:
obtaining a first training sample set, the first training sample set comprising sentence samples with noise obtained through an active learning process, wherein the active learning process includes identifying negative samples in the first training sample set and assigning different weights to the negative samples, and the weight of a negative sample indicates the amount of information of the negative sample;
performing denoising processing on the first training sample set to form a corresponding second training sample set;
processing the second training sample set by using a semantic understanding model, to determine initial parameters of the semantic understanding model;
processing the second training sample set by using the semantic understanding model in response to the initial parameters of the semantic understanding model, to determine update parameters of the semantic understanding model; and
iteratively updating a semantic representation layer network parameter and a task-related output layer network parameter of the semantic understanding model by using the second training sample set and according to the update parameters of the semantic understanding model.

14. The electronic device according to claim 13, wherein the processing the second training sample set by using the semantic understanding model in response to the initial parameters of the semantic understanding model, to determine update parameters of the semantic understanding model comprises:
substituting different sentence samples in the second training sample set into a loss function corresponding to a task-related output layer network formed by an out-of-domain (OOD) detector network and a domain classification network of the semantic understanding model; and
determining a corresponding OOD detector network parameter and a corresponding domain classification network parameter in the semantic understanding model as the update parameters of the semantic understanding model when the loss function meets a corresponding convergence condition.

15. The electronic device according to claim 13, wherein the plurality of operations further comprise:
performing negative processing on the second training sample set to form a negative sample set corresponding to the second training sample set, the negative sample set being configured to adjust an OOD detector network parameter and a domain classification network parameter of the semantic understanding model; and
determining a corresponding bilingual evaluation research value according to the negative sample set, the bilingual evaluation research value being configured as a supervision parameter to evaluate a semantic understanding result of the semantic understanding model.

16. The electronic device according to claim 13, wherein the plurality of operations further comprise:
obtaining speech instruction information, and converting the speech instruction information into corresponding recognizable text information;
determining at least one word-level hidden variable corresponding to the recognizable text information by using the semantic understanding model;
determining an object matching the word-level hidden variable according to the at least one word-level hidden variable and by using an out-of-domain (OOD) detector network of the semantic understanding model;
determining a task domain corresponding to the word-level hidden variable according to the at least one word-level hidden variable and by using a domain classification network of the semantic understanding model; and
triggering a corresponding service process according to the object matching the word-level hidden variable and the task domain corresponding to the word-level hidden variable, to complete a task corresponding to the speech instruction information.

17. A non-transitory computer-readable storage medium, storing executable instructions, the executable instructions, when executed by a processor of an electronic device, performing a plurality of operations including:
obtaining a first training sample set, the first training sample set comprising sentence samples with noise obtained through an active learning process, wherein the active learning process includes identifying negative samples in the first training sample set and assigning different weights to the negative samples, and the weight of a negative sample indicates the amount of information of the negative sample;
performing denoising processing on the first training sample set to form a corresponding second training sample set;
processing the second training sample set by using a semantic understanding model, to determine initial parameters of the semantic understanding model;
processing the second training sample set by using the semantic understanding model in response to the initial parameters of the semantic understanding model, to determine update parameters of the semantic understanding model; and iteratively updating a semantic representation layer network parameter and a task-related output layer network parameter of the semantic understanding model by using the second training sample set and according to the update parameters of the semantic understanding model.

18. The non-transitory computer-readable storage medium according to claim 17, wherein the processing the second training sample set by using the semantic understanding model in response to the initial parameters of the semantic understanding model, to determine update parameters of the semantic understanding model comprises:
substituting different sentence samples in the second training sample set into a loss function corresponding to a task-related output layer network formed by an out-of-domain (OOD) detector network and a domain classification network of the semantic understanding model; and
determining a corresponding OOD detector network parameter and a corresponding domain classification network parameter in the semantic understanding model as the update parameters of the semantic understanding model when the loss function meets a corresponding convergence condition.

19. The non-transitory computer-readable storage medium according to claim 17, wherein the plurality of operations further comprise:
performing negative processing on the second training sample set to form a negative sample set corresponding to the second training sample set, the negative sample set being configured to adjust an OOD detector network parameter and a domain classification network parameter of the semantic understanding model; and
determining a corresponding bilingual evaluation research value according to the negative sample set, the bilingual evaluation research value being configured as a supervision parameter to evaluate a semantic understanding result of the semantic understanding model.

20. The non-transitory computer-readable storage medium according to claim 17, wherein the plurality of operations further comprise:
obtaining speech instruction information, and converting the speech instruction information into corresponding recognizable text information;
determining at least one word-level hidden variable corresponding to the recognizable text information by using the semantic understanding model;
determining an object matching the word-level hidden variable according to the at least one word-level hidden variable and by using an out-of-domain (OOD) detector network of the semantic understanding model;
determining a task domain corresponding to the word-level hidden variable according to the at least one word-level hidden variable and by using a domain classification network of the semantic understanding model; and
triggering a corresponding service process according to the object matching the word-level hidden variable and the task domain corresponding to the word-level hidden variable, to complete a task corresponding to the speech instruction information.

* * * * *